United States Patent
Robinson

(10) Patent No.: US 10,555,515 B2
(45) Date of Patent: Feb. 11, 2020

(54) ADJUSTABLE FISHING FLOAT

(71) Applicant: Cory V. Robinson, New Richmond, WI (US)

(72) Inventor: Cory V. Robinson, New Richmond, WI (US)

( * ) Notice: Subject to any disclaimer, the term of this patent is extended or adjusted under 35 U.S.C. 154(b) by 0 days.

(21) Appl. No.: 16/190,339

(22) Filed: Nov. 14, 2018

(65) Prior Publication Data
US 2019/0150420 A1  May 23, 2019

Related U.S. Application Data

(63) Continuation of application No. 12/824,225, filed on Jun. 27, 2010, now abandoned.

(51) Int. Cl.
*A01K 93/00* (2006.01)

(52) U.S. Cl.
CPC ..................... *A01K 93/00* (2013.01)

(58) Field of Classification Search
CPC ....................................................... A01K 93/00
USPC .......................... 43/43.14, 42.22, 43.1, 44.87
See application file for complete search history.

(56) References Cited

U.S. PATENT DOCUMENTS

| | | | | |
|---|---|---|---|---|
| 2,127,667 A | * | 8/1938 | Pflueger | A01K 93/00 43/44.95 |
| 2,221,168 A | * | 11/1940 | Pflueger | A01K 93/00 43/43.1 |
| 2,519,427 A | * | 8/1950 | Besmer | A01K 93/00 43/43.14 |
| 2,726,474 A | * | 12/1955 | Soskice | A01K 93/00 43/43.14 |
| 2,741,864 A | * | 4/1956 | Shotton | A01K 93/00 43/44.9 |
| 2,986,839 A | * | 6/1961 | James | A01K 93/00 43/43.14 |
| 3,012,359 A | * | 12/1961 | Clugston | A01K 93/00 43/43.14 |
| 3,092,925 A | * | 6/1963 | Ho | A01K 97/14 43/5 |
| 3,337,981 A | * | 8/1967 | Bowman | A01K 93/00 43/43.14 |
| 3,367,058 A | * | 2/1968 | Dominique | A01K 85/01 43/42.06 |
| 3,698,120 A | * | 10/1972 | Grogan | A01K 93/00 43/43.14 |

(Continued)

FOREIGN PATENT DOCUMENTS

| | | | | |
|---|---|---|---|---|
| DE | 4027737 A1 | * | 3/1992 | ............. A01K 93/00 |
| DE | 19631721 A1 | * | 2/1997 | ............. A01K 93/00 |

(Continued)

OTHER PUBLICATIONS

Translation of EP 575238 (Year: 1993).*

*Primary Examiner* — Darren W Ark
(74) *Attorney, Agent, or Firm* — Skinner and Associates; Joel D. Skinner, Jr.

(57) ABSTRACT

An adjustable fishing float with first and second portions slidably joined to form an adjustable air space with the float. The buoyancy of the float may be altered by sliding a first portion further within the second portion or drawing the first portion further out of the second portion. The first and second portions define a sliding water resistant joint to prevent water from intruding into the air space.

9 Claims, 52 Drawing Sheets

(56) References Cited

U.S. PATENT DOCUMENTS

| | | | | |
|---|---|---|---|---|
| 3,820,270 A * | 6/1974 | La Force | A01K 93/00 | 43/43.14 |
| 3,852,906 A * | 12/1974 | LaForce | A01K 95/00 | 43/43.14 |
| 3,990,172 A * | 11/1976 | Hagquist | A01K 93/00 | 43/43.14 |
| 4,060,925 A * | 12/1977 | Bias | A01K 93/00 | 43/41.2 |
| 4,202,128 A * | 5/1980 | Hill | A01K 93/00 | 43/43.14 |
| 4,693,030 A * | 9/1987 | Wohead | A01K 95/00 | 43/42.22 |
| 4,944,113 A * | 7/1990 | Jean | A01K 93/00 | 43/43.14 |
| 5,507,112 A * | 4/1996 | Cheney, Jr. | A01K 91/02 | 43/41.2 |
| 5,970,649 A * | 10/1999 | Alain | A01K 93/00 | 43/43.14 |
| 6,079,147 A * | 6/2000 | Mosher | A01K 93/00 | 43/43.14 |
| 6,467,214 B1 * | 10/2002 | De Frisco | A01K 93/00 | 43/43.1 |
| 6,484,435 B1 * | 11/2002 | Mosher | A01K 91/06 | 43/43.1 |
| 6,510,646 B1 * | 1/2003 | Kechriotis | A01K 85/16 | 43/42.22 |
| 6,655,073 B2 * | 12/2003 | Mosher | A01K 91/06 | 43/43.1 |
| 6,836,997 B2 * | 1/2005 | Cramsey | A01K 93/00 | 43/42.06 |
| 8,365,459 B2 * | 2/2013 | Bennis | A01K 91/03 | 43/43.1 |
| 8,756,855 B2 * | 6/2014 | Bennis | A01K 91/03 | 43/44.9 |
| 2005/0257419 A1 * | 11/2005 | Weeda | A01K 91/20 | 43/44.87 |
| 2006/0117641 A1 * | 6/2006 | Kumlin | A01K 85/16 | 43/42.22 |
| 2006/0213114 A1 * | 9/2006 | Kumlin | A01K 93/00 | 43/43.14 |
| 2012/0073183 A1 * | 3/2012 | Kissee | A01K 93/00 | 43/43.14 |

FOREIGN PATENT DOCUMENTS

| | | | | |
|---|---|---|---|---|
| EP | 575238 A1 * | 12/1993 | | |
| FR | 2597718 A1 * | 10/1987 | | A01K 93/00 |
| FR | 2648673 A1 * | 12/1990 | | A01K 93/00 |
| FR | 2652484 A1 * | 4/1991 | | A01K 93/00 |
| FR | 2712460 A1 * | 5/1995 | | A01K 93/00 |
| FR | 2722367 A1 * | 1/1996 | | A01K 93/00 |
| FR | 2756460 A1 * | 6/1998 | | A01K 93/00 |
| FR | 2756461 A1 * | 6/1998 | | A01K 93/00 |
| FR | 2758238 A1 * | 7/1998 | | A01K 93/00 |
| FR | 2773435 A3 * | 7/1999 | | A01K 93/00 |
| FR | 2815225 A1 * | 4/2002 | | A01K 93/00 |
| GB | 1223601 A * | 2/1971 | | A01K 93/00 |
| GB | 1241644 A * | 8/1971 | | A01K 93/00 |
| GB | 2148081 A * | 5/1985 | | A01K 93/00 |
| GB | 2151441 A * | 7/1985 | | A01K 93/00 |
| GB | 2155292 A * | 9/1985 | | A01K 93/00 |
| GB | 2157931 A * | 11/1985 | | A01K 93/00 |
| GB | 2172481 A * | 9/1986 | | A01K 93/00 |
| GB | 2203622 A * | 10/1988 | | A01K 93/00 |
| GB | 2208781 A * | 4/1989 | | A01K 93/00 |
| GB | 2238697 A * | 6/1991 | | A01K 93/00 |
| GB | 2240698 A * | 8/1991 | | A01K 93/00 |
| GB | 2263218 A * | 7/1993 | | |
| GB | 2279218 A * | 1/1995 | | A01K 93/00 |
| GB | 2295074 A * | 5/1996 | | A01K 93/00 |
| GB | 2305098 A * | 4/1997 | | A01K 93/00 |
| GB | 2305344 A * | 4/1997 | | A01K 93/00 |
| GB | 2506946 B * | 3/2017 | | A01K 93/00 |
| JP | 08019358 A * | 1/1996 | | |
| JP | 10117652 A * | 5/1998 | | |
| JP | 10225253 A * | 8/1998 | | |
| JP | 10248459 A * | 9/1998 | | |
| JP | 10276643 A * | 10/1998 | | |
| JP | 10290652 A * | 11/1998 | | |
| JP | 11098941 A * | 4/1999 | | |
| JP | 11113465 A * | 4/1999 | | |
| JP | 11206296 A * | 8/1999 | | |
| JP | 11225638 A * | 8/1999 | | |
| JP | 2000014294 A * | 1/2000 | | |
| JP | 2000014295 A * | 1/2000 | | |
| JP | 2000139306 A * | 5/2000 | | |
| JP | 2000139308 A * | 5/2000 | | |
| JP | 2000166448 A * | 6/2000 | | |
| JP | 2000197434 A * | 7/2000 | | |
| JP | 2000350540 A * | 12/2000 | | |
| JP | 2003061534 A * | 3/2003 | | |
| JP | 2005034070 A * | 2/2005 | | |
| KR | 100639600 B1 * | 10/2006 | | |
| KR | 100944630 B1 * | 2/2010 | | |
| KR | 20100009794 U | 10/2010 | | |
| KR | 20120095501 A * | 8/2012 | | |
| KR | 101275687 B1 * | 6/2013 | | |
| KR | 101476655 B1 * | 12/2014 | | |
| KR | 101505087 B1 * | 3/2015 | | |
| WO | WO-9524123 A1 * | 9/1995 | | A01K 93/00 |
| WO | WO-02067672 A1 * | 9/2002 | | A01K 93/00 |
| WO | WO-2004086859 A1 * | 10/2004 | | A01K 93/00 |
| WO | WO-2014069865 A1 * | 5/2014 | | |

* cited by examiner

ADJUSTABLE FISHING FLOAT

CROSS-REFERENCE TO RELATED APPLICATIONS

This application is a continuation of U.S. patent application Ser. No. 12/824,225, filed Jun. 27, 2010, status pending, which claims priority to the following U.S. patent application Ser. No. 61/110,769, filed Jun. 26, 2009; Ser. No. 61/233,282, filed Aug. 12, 2009; Ser. No. 61/251,363, filed Oct. 14, 2009; Ser. No. 61/252,692, filed Oct. 18, 2009; Ser. No. 61/267,048, filed Dec. 6, 2009, and Ser. No. 61/267,049, filed Dec. 6, 2009. The disclosures of these applications are incorporated herein by reference in their entirety.

TECHNICAL FIELD

The present disclosure relates generally to adjustable buoyancy floats for fishing.

BACKGROUND

It is common for anglers to select a float or bobber for use with a fishing line based on the weight of the bait, hook and other elements used below the float, and based on the particular depth that the bait is desirably presented. Depending on the particular setting, it may be desirable to have a float that lies flat on the water's surface, a float that is very closely matched to the weight being supported and floats right at the surface, or a float that supports the bait and floats just below the surface of the water. Other variations of the desired amount of buoyancy may be selected as desired by the angler. Changing any of the lure, bait or weights used, or the desired presentation, or the length or nature of the rigging extending between the float and the bait or lure presented, may make an alteration of the buoyancy provided by the float used desirable. It is desirable to be able to alter the buoyancy of a float without needing to change the float used.

Known solutions to the variation of the amount of buoyancy provided by a float include providing a variety of sizes and shapes to be carried by an angler so that the angler may select the most appropriate shape or buoyancy based on conditions, or having an adjustable float that permits the buoyancy to be varied based on conditions. Current approaches to adjustable floats have included permanent alteration of the float to adapt it to the desired buoyancy. Once altered, the float can only be made to provide progressively less buoyancy with each subsequent alteration.

Improvements to the current approaches to providing anglers with variable degrees of buoyancy in their floats and adjustability of the degree of buoyancy are desirable.

BRIEF DESCRIPTION OF THE DRAWINGS

The accompanying drawing figures, which are incorporated in and constitute a part of the description, illustrate several aspects of the invention and together with the description, serve to explain the principles of the invention. A brief description of the figures is as follows.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
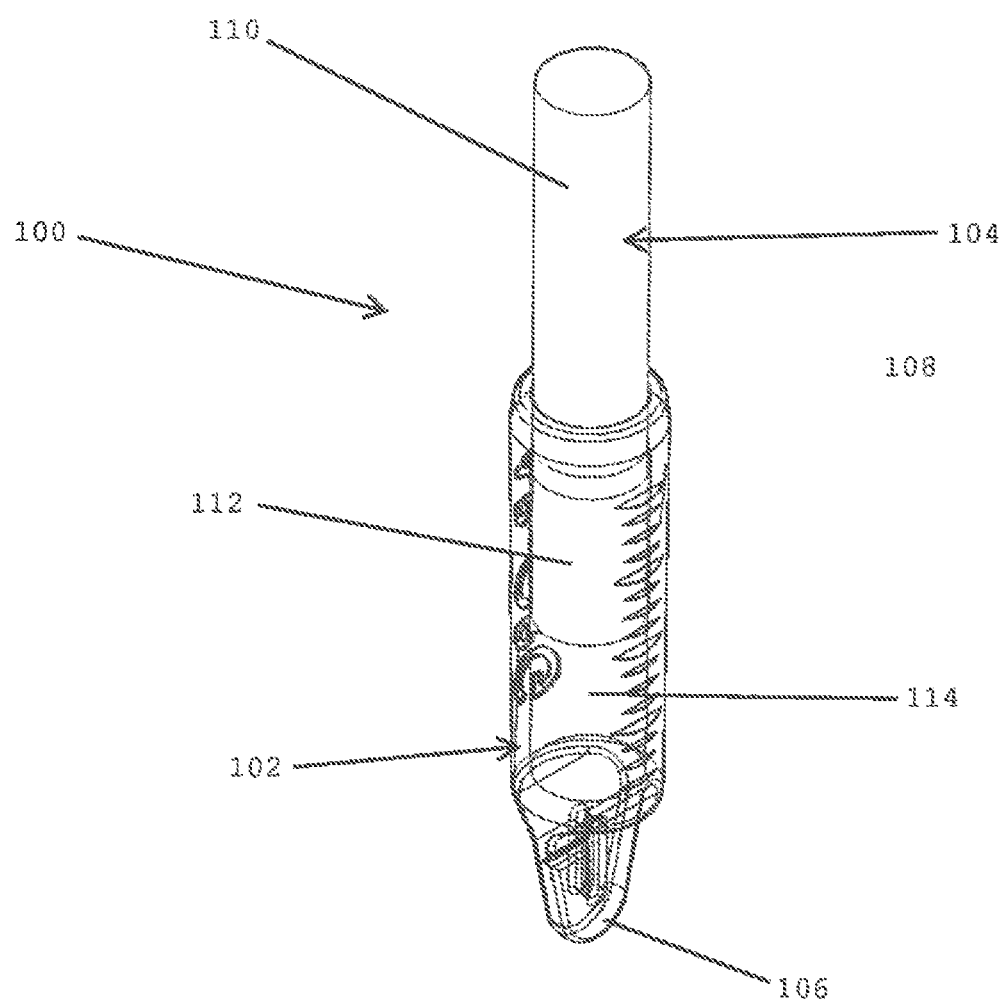
FIG. 1 is a perspective view of an adjustable fishing float according to the present disclosure.
Figure 2:
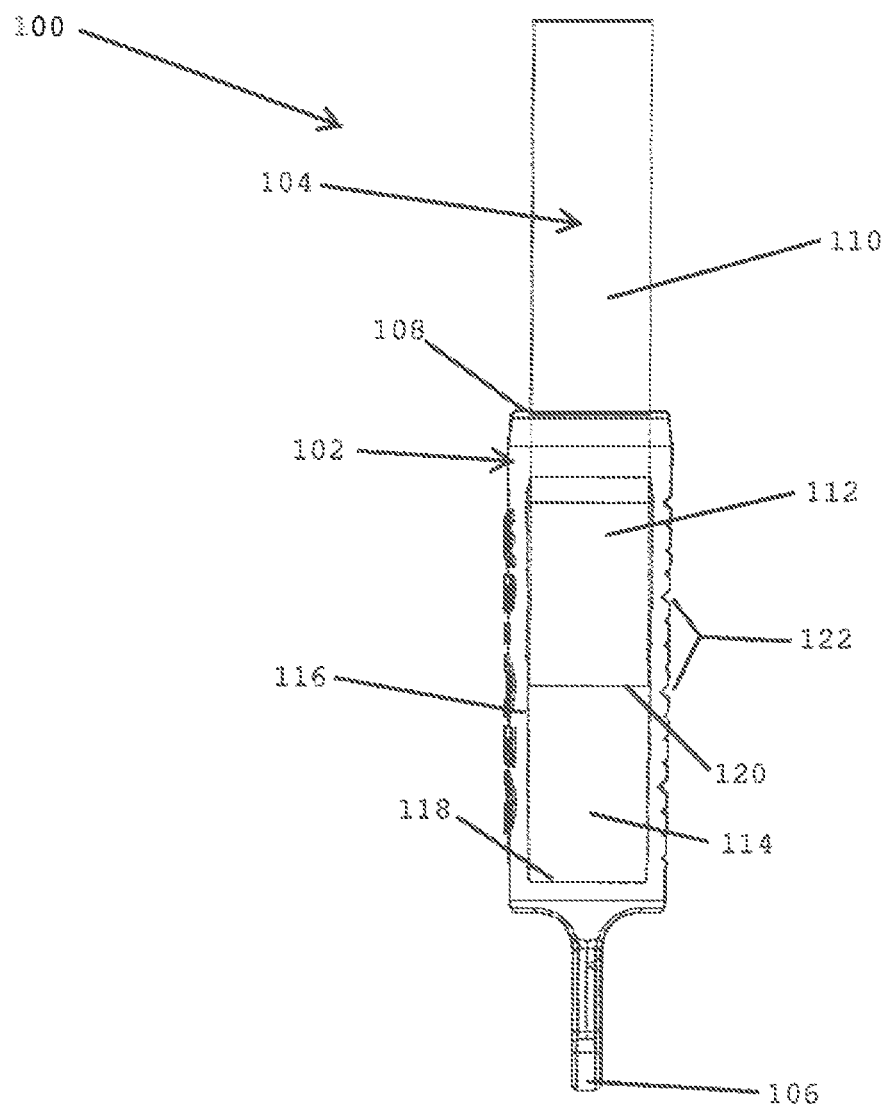
FIG. 2 is a side view of the float of FIG. 1.
Figure 3:
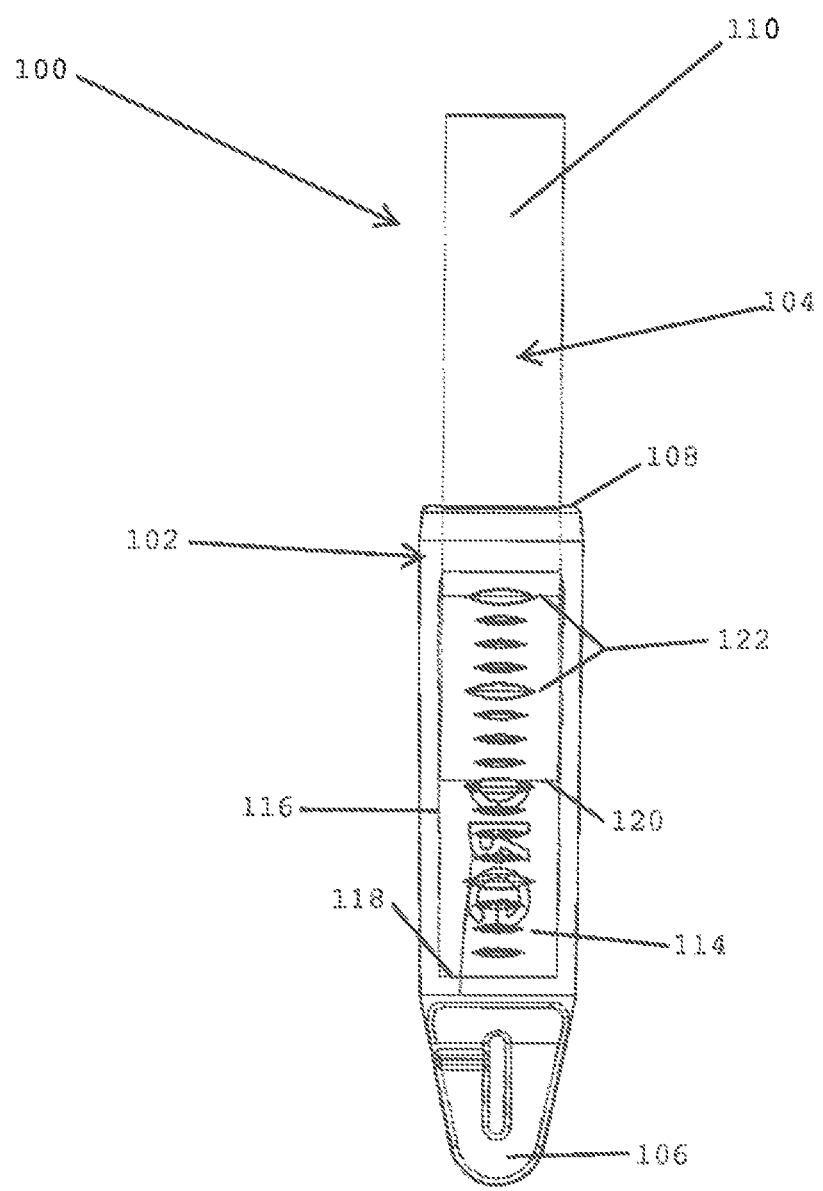
FIG. 3 is a second side view of the float of FIG. 1, taken approximately ninety degrees from the view in FIG. 2.

FIGS. 1 to 3 illustrate an adjustable float 100 for angling that may include a lower body 102 and an insert 104 inserted within a central opening of lower body 102 through an open top end 108 of lower body 102. At an opposite end of lower body 102 may be a line attachment 106 for linking float 100 to a desired fishing line. Insert 104 includes an outer portion 110 extending outside of lower body 102 and an inner portion 112 extending within lower body 102. Insert 104 is slidably mounted through top end 108 and the proportion of outer portion 110 and inner portion 112 may be changed as needed to achieve the desired amount of buoyancy by sliding insert 104 either further into or drawing insert 104 further out of lower body 102.

Within lower body 102 is defined an interior cavity 116 for receiving and mating with insert 104. As the proportion of portions 110 and 112 is altered, an air space 114 within cavity 116, defined by a bottom 118 of cavity 116 and a inner end 120 of insert 104, is varied in size. Insert 104 and lower body 102 preferably form a water resistant movable mating surface adjacent top end 108. By keeping water out of air space 114, the air space can be used to alter the buoyancy as desired.

By way of a non-limiting example, float 100 may be designed and constructed from materials intended to provide a beginning lowest level or base line of buoyancy. This base line amount would be the buoyancy provided by float 100 with insert 104 fully inserted with lower body 102 to effectively reduce air space 114 to a minimum. To change, or increase the amount of buoyancy provided by float 100 from this base line amount, insert 104 would be drawn partially out of lower body 102 to increase the size of air space 114. By way of contrast, conventional adjustable floats (such as device 702 described below) provide for variation of buoyancy through the paring away of one or more buoyant portions of the float.

The present disclosure relates to floats which are adjustable primarily through the increase or decrease of an air space within the float. Float 100, for example, will displace more water as insert 104 is positioned further out within lower body 102. Air space 114 will be increased and while the weight of the overall float has not changed, the degree of buoyancy has increased (same weight float displacing more water results in greater buoyancy). Conversely, positioning insert 104 deeper within lower body 102 will reduce the overall displacement of float 100 resulting in less buoyancy without changing the weight of the float. The overall weight of the float may be changed, as described herein below, but the adjustment of the displacement of the device is the primary means of adjusting buoyancy for any given weight of a float according to the present disclosure.

As a non-limiting example of the use of a float according to the present disclosure, such an adjustable float may be used during ice fishing. After a hole has been formed or drilled in the ice, the water exposed to the ambient air temperature may have a tendency to freeze, essentially reforming the ice that was removed to make the hole. If a float is used. that rides at the surface of the water, i.e., the float having positive buoyancy, the float may be frozen into the newly forming ice and thereby the movement of the float may be inhibited. Without being able to see the movement of the float to indicate that a fish may be at the bait below the surface, the angler will not get any sort of accurate read of when to set the hook and secure the fish. It may be desirable to have a float that is neutral buoyancy such that the float rides just below the surface of the water within the hole in the ice. Such a float is still free to move to provide a strike indication, even if the water at the surface of the hole begins to freeze up.

It is anticipated that lower body 102 may be made of a transparent or translucent material so that the location of inner end 120, and thus the size of air space 114, can be seen through lower body 102. A series of indicia 122 may be provided along one or more sides of lower body 102 to provide reference marks when a particular amount of buoyancy is desired. Alternatively, lower body 102 could be made of a opaque material and indicia or reference marks could be added along insert 104.

The mating of lower body 102 and insert 104 preferably includes some degree of resilient deformation in one or both of the elements. The deformation will help ensure a water resistant joining of the two elements to prevent intrusion of water into air space 114. It is anticipated that insert 104 may be made of a resilient foam with lower body 102 being made of a stiffer, less compliant plastic or polymer. If either of lower body 102 or insert 104 are cast or molded, there may be some manufacturing variation or surface imperfections. The resilience of the foam insert could still provide an adequate seal to prevent intrusion of water into air space 114.

Having lower body 102 molded of a stiffer material may also allow line attachment 106 to be formed of the same material, possibly reducing part count or manufacturing processes required, allowing for greater manufacturing efficiency.

The materials selected for lower body 102 and insert 104 may be chosen based on their specific gravity so that the baseline buoyancy of float 100 may be set at a desired level.

Using materials of different densities might allow the same molds or sizes to be used for floats of varying baseline buoyancies. Alternatively, floats of different buoyancy could be made of the same materials but in different sizes.

It may be desirable to be able to allow entry of air into air space 114 to aid in extraction of insert 104. By having insert being made of a deformable foam, it may be possible to twist outer portion 112 sufficiently to reduce width W of insert 104 and permit air to pass through open end 108 and into air space 114. Alternatively, float 100 may be provided with either an automatic vent or a manual vent that will permit excess air pressure within air space 114 to escape to permit air to enter air space 114 when insert 104 is drawn out from lower body 102.

Figure 4:
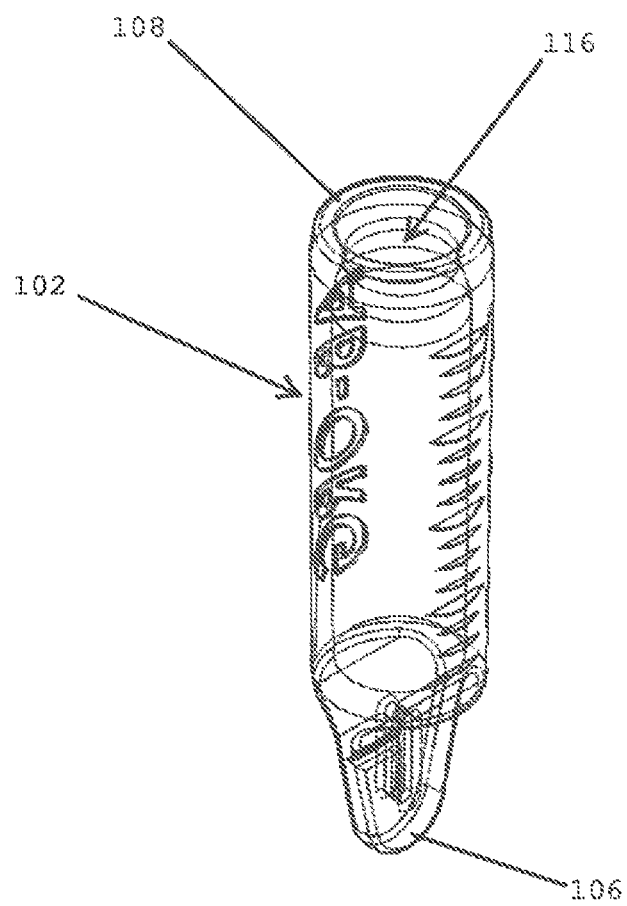
FIG. 4 is a perspective view of a lower body of the float of FIG. 1.
Figure 5:
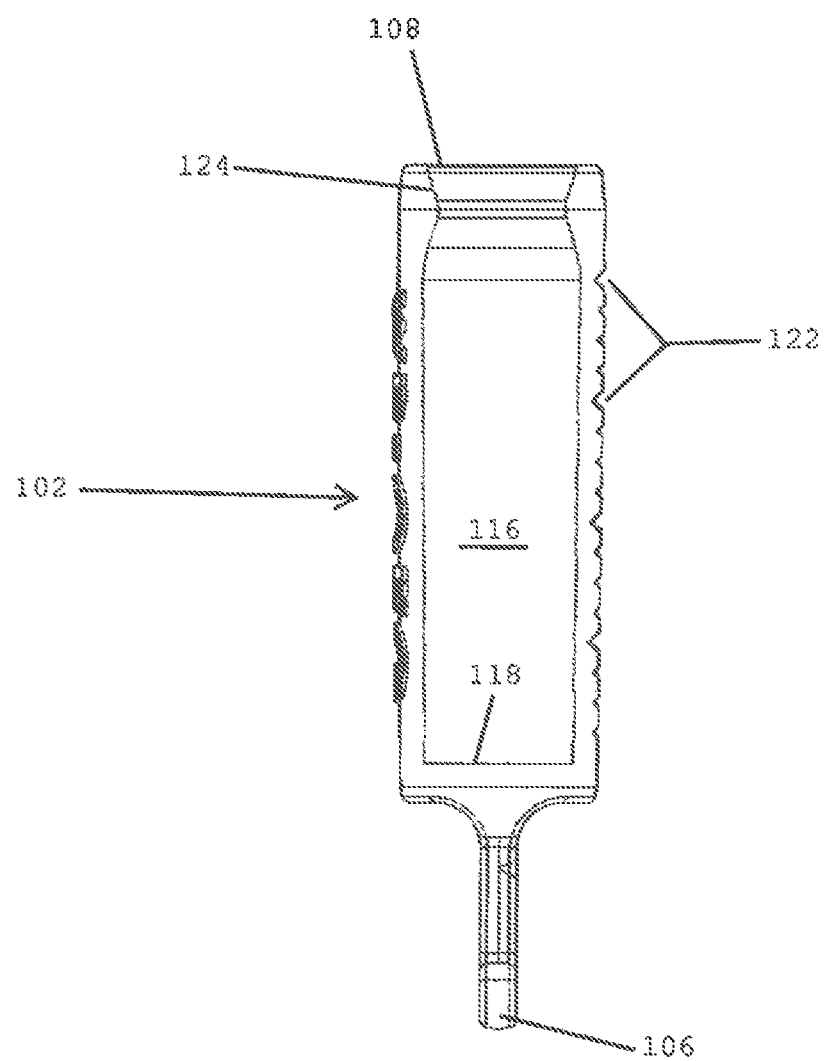
FIG. 5 is a side view of the lower body of FIG. 4.
Figure 6:
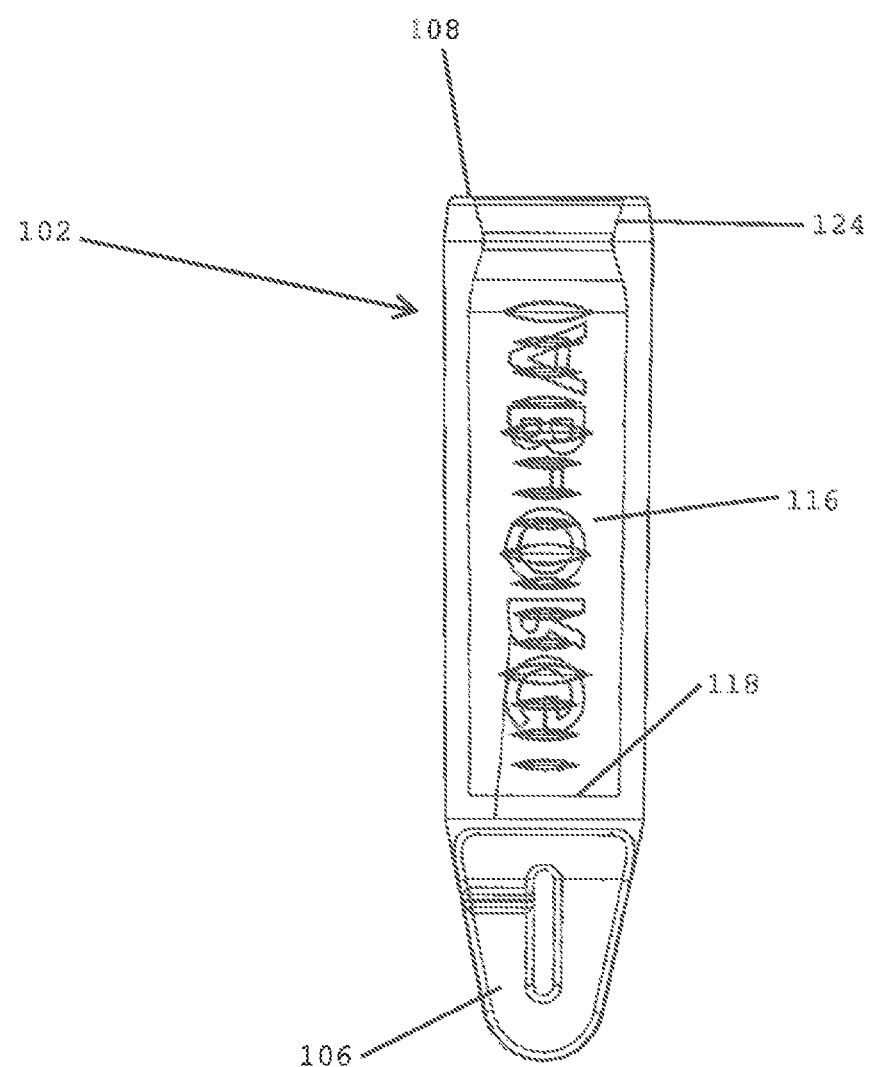
FIG. 6 is second side view of the lower body of FIG. 4, taken approximately ninety degrees from the view in FIG. 5.

Referring now to FIGS. 4 to 6, lower body 102 is illustrated with a narrowing 124 adjacent open top end 108 to pinch in on insert 104 and provide the water resistant movable join between the two elements. The particular shape of narrowing 124 may be altered as desired for manufacturing efficiency or production ease, and while shown as a more linear in nature, may also be rounded or otherwise shaped.

Figure 7:
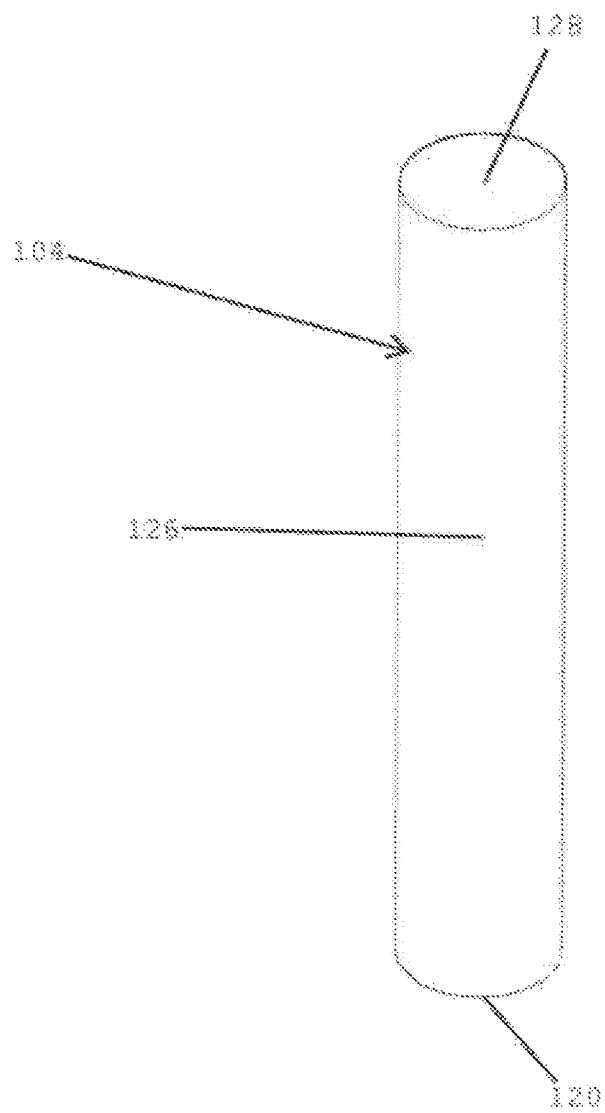
FIG. 7 is a perspective view of an insert of the float of FIG. 1.
Figure 8:
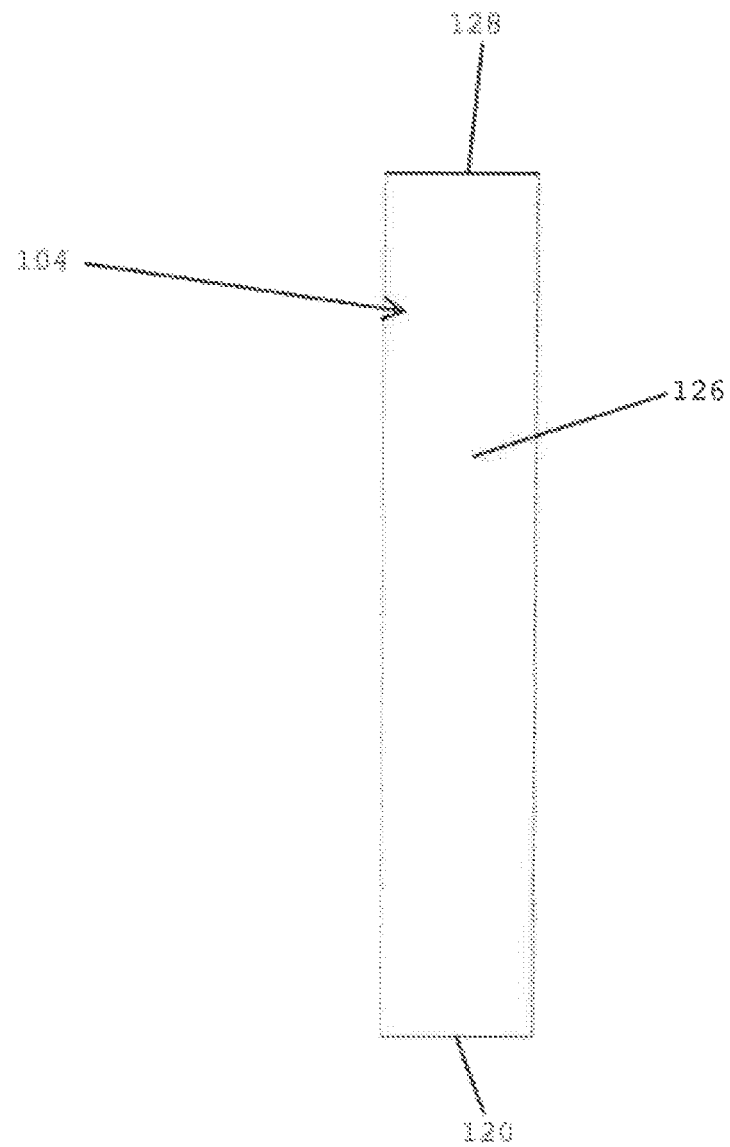
FIG. 8 is a side view of the insert of FIG. 7.

FIGS. 7 and 8 illustrate insert 104 which may preferably have a straight sided outer wall 126 that is sized slightly larger than narrowing 124 of open top end 108. While float 100 may be constructed from a straight sided insert that is oversized within respect to the overall size of cavity 116, this may be less desirable as the resistance to movement of the insert within the lower body may increase undesirably the further the insert is positioned within the cavity. Narrowing 124 in cooperation with the outer diameter of insert 104 provides the desired water resistant seal while still enabling ease of movement of insert 104 within lower body 102 for adjustment of buoyancy. An outer end 128 of insert 104 is shown as flat and generally perpendicular to side wall 126 but it is anticipated that outer portion 112 and outer end 128 may be shaped as desired for decorative purposes or for allowing minor alterations in baseline buoyancy of float 100.

Figure 9:
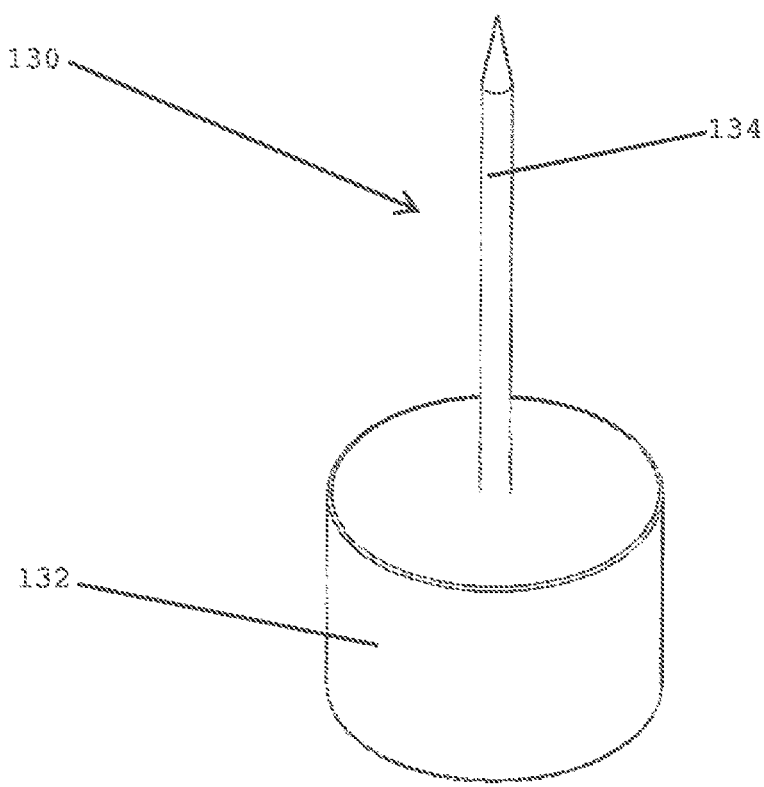
FIG. 9 is a perspective view of an add-on weight for use with the float of FIG. 1.
Figure 10:
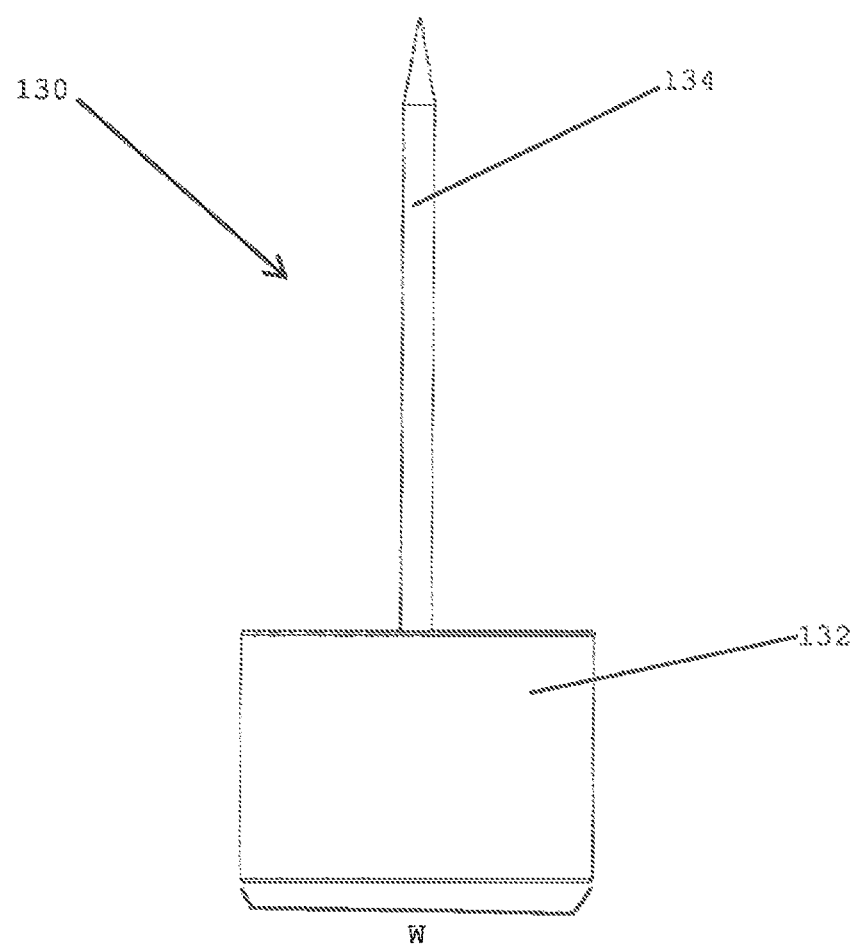
FIG. 10 is a side view of the weight of FIG. 9.
Figure 11:
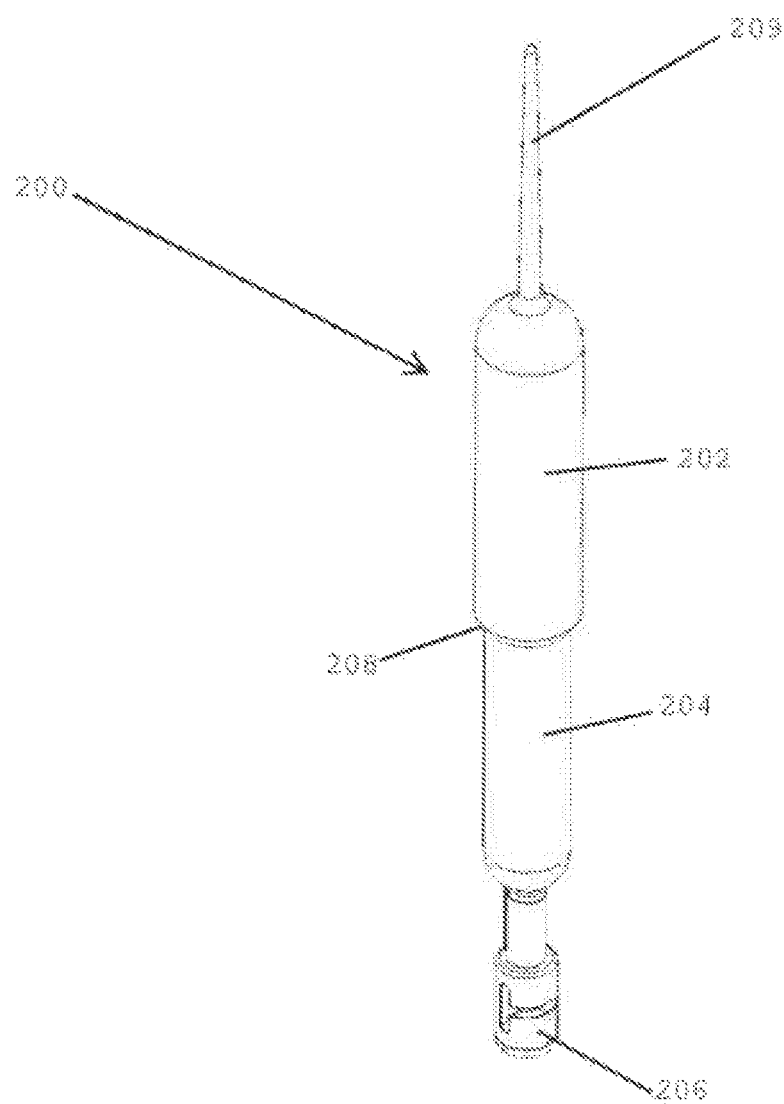
FIG. 11 is a perspective view of a first alternative embodiment of an adjustable float according to the present disclosure.
Figure 12:
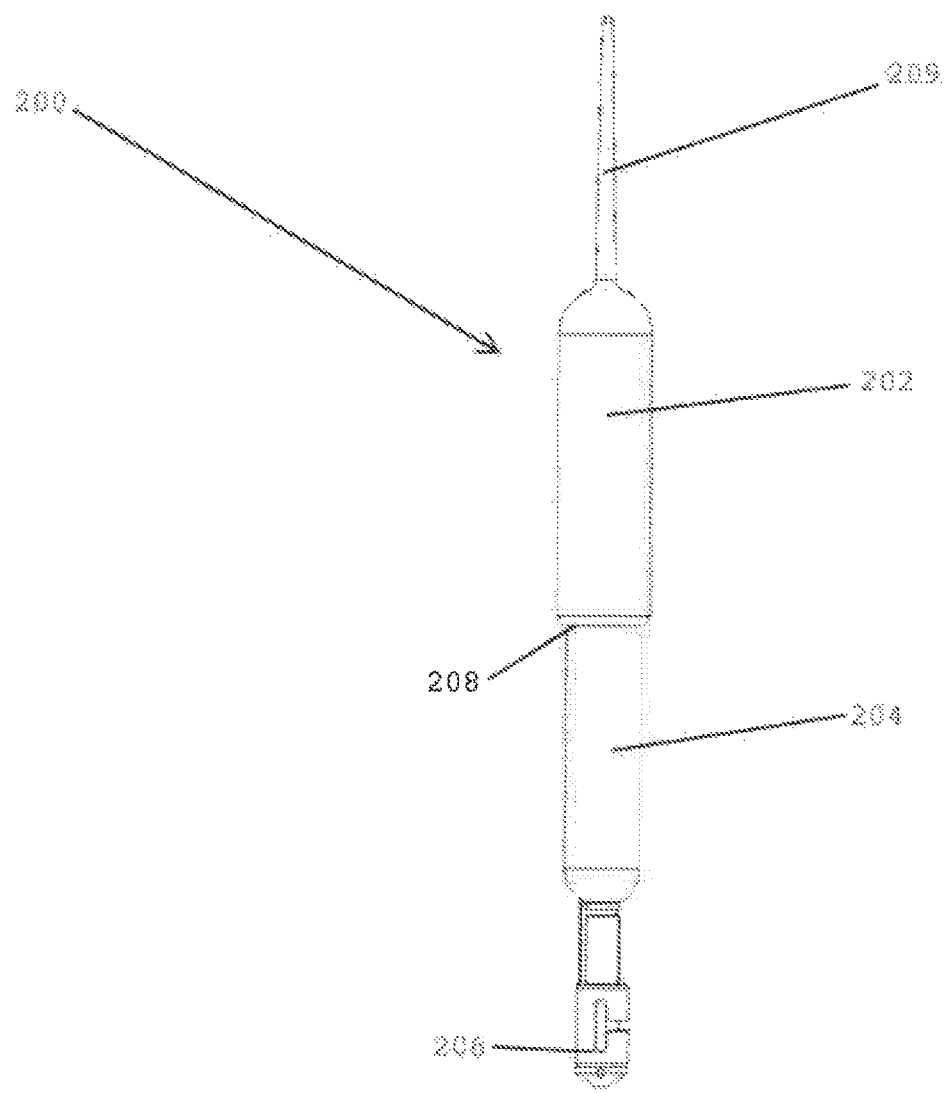
FIG. 12 is a side view of the float of FIG. 11.
Figure 13:
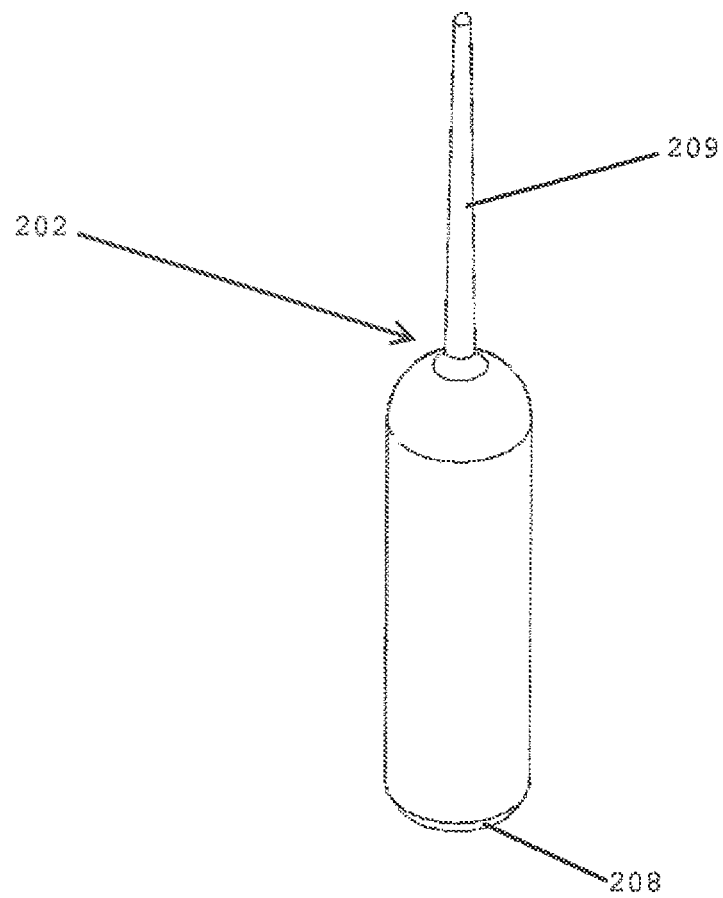
FIG. 13 is a perspective view of an upper portion of the float of FIG. 11.
Figure 14:
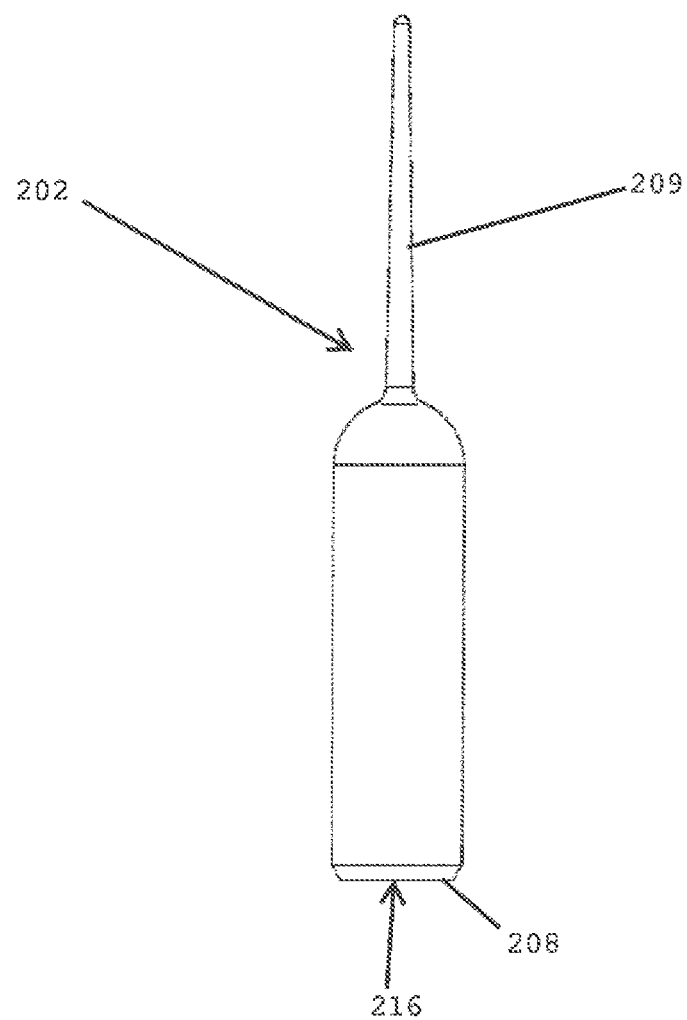
FIG. 14 is a side view of the upper portion FIG. 13.
Figure 15:
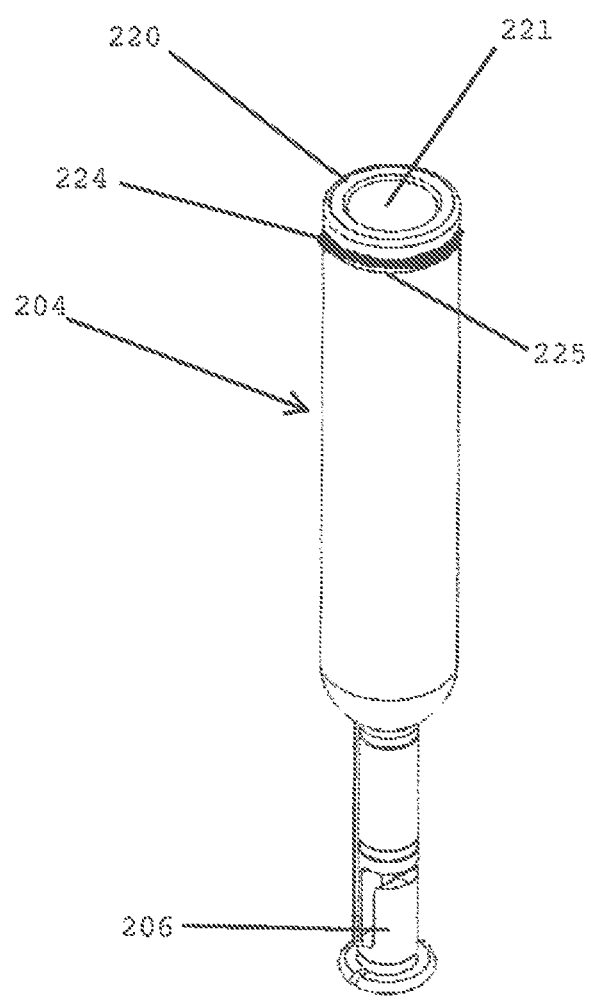
FIG. 15 is perspective view of a lower portion of the float of FIG. 11.
Figure 16:
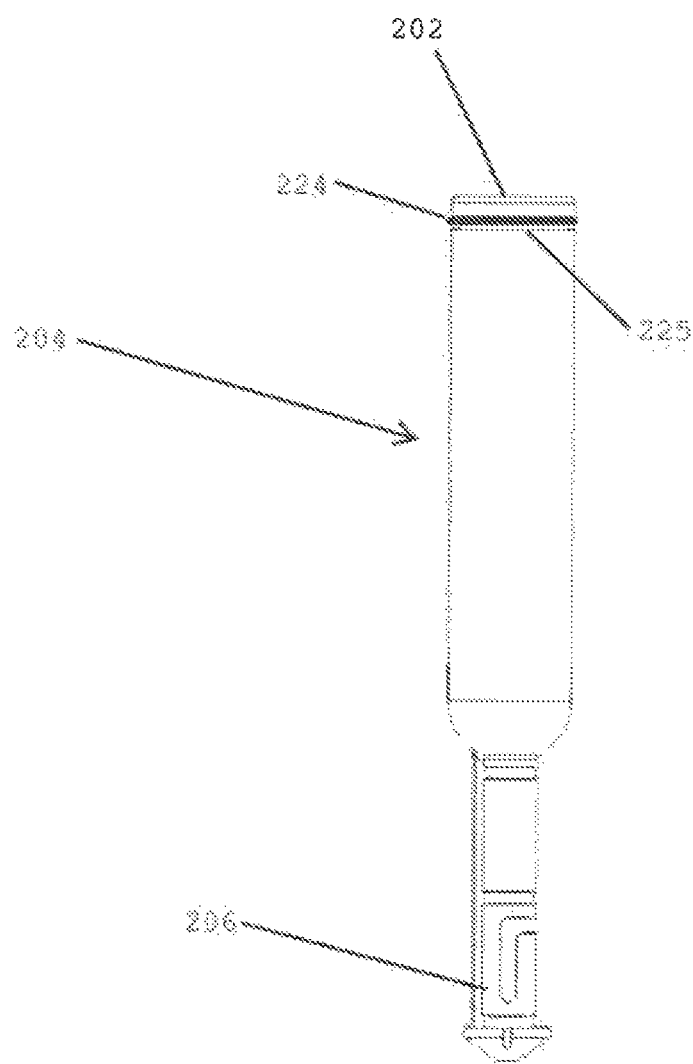
FIG. 16 is a side view of the lower portion of FIG. 15.

FIGS. 9 and 10 illustrate a weight 130 that may used in conjunction with float 100 to decrease the baseline buoyancy of float 100. If float 100 is too buoyant for the bait and rigging used, or if it is desired that the bait actually be permitted to descend in the water at a set or fixed rate, float 100 may have its baseline buoyancy reduced through the addition of weight 130. To add weight 130 to float 100, insert 104 may be removed from lower body 102, exposing inner end 120. A spike 134 extending from a body 132 may be inserted into insert 104 through inner end 120. Preferably, body 132 is sized to have a width W permitting the weight to pass through narrowing 124 without hanging up so that insert 104 may be repositioned within cavity 116 with weight 130 between inner end 120 and bottom 118 of cavity 116.

Larger and smaller weights 130 may be used with the same float 100 to provide for additional levels of reduced buoyancy for the float. It should be noted that, depending on the size and weight of the bait and rigging used on the fishing line below float 100, float 100 may provide negative buoyancy without the addition of any weights 130 being necessary. It should also be noted that through the careful adjustment of the buoyancy of float 100 with regard to the weight of bait and rigging, float 100 may provide neutral buoyancy with float 100 at some level below the surface of the water. This neutral buoyancy suspended below the surface may be especially useful when float 100 is used for ice fishing. It is known that ice forms on the water's surface within the ice hole when ice fishing. Having a float directly at the surface of the water may result in the float being frozen in place. Such a frozen float may continue to hold the bait at a desired level but this same float will have a diminished capacity react to and signal strikes on the bait. It should be further noted that the present disclosure, while adaptable to ice fishing, is not limited in utility to solely ice fishing.

Figure 39:
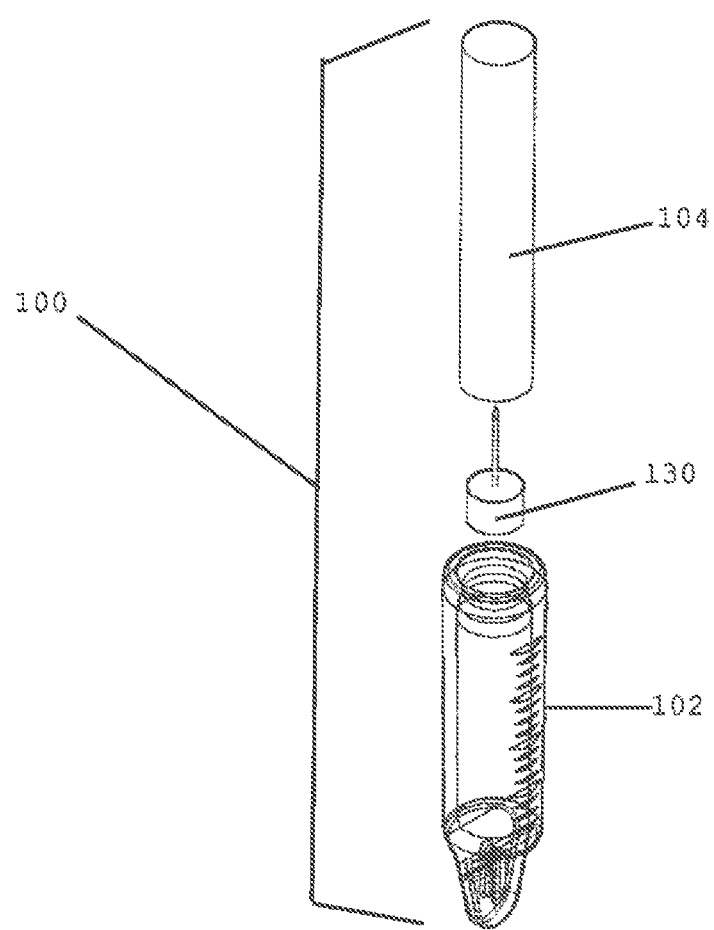
FIG. 39 is a perspective exploded view of the float of FIG. 1 showing a weight installed within the lower body.

As described above, air space 114 is either filled with air or a specific weight my be added to float 100. It is anticipated that the buoyancy of floats according to the present disclosure may be altered by including almost any object that fits within the space defined between the male and female portions of the float. Such items as rocks, sand or pebbles may be used to add weight to the float when more negative buoyancy is desired. For neutral buoyancy, the space may be filled with water. FIG. 39 illustrates the positioning of weight 130 within airspace 114 and any other object to be used as a weight or buoyancy altering element may be substituted for weight 130 in this FIG.

Weights for use with the present disclosure may also no include any feature such as spike 134 for engaging insert 104 but may be simply placed within the air space. It is also anticipated that additional weights may be added to the outside of a float according to the present disclosure to alter buoyancy by an amount that might not otherwise be possible by use of the air space or weights mounted within the float.

FIGS. 11 to 16 illustrate a float 200 that is more specifically designed and intended for use in non-frozen water. Float 200 may include an upper female portion 202 and a lower male portion 204 with a lower line attachment means 206. Male portion 204 may be received within a cavity defined inside female portion 202 through an open end 208. Female portion 202 may also include an upper strike indicator 209.

Female portion 202 defines an inner cavity 216 accessed through open end 208. An inner end 220 of male portion 204 may be inserted within open end 208. Adjacent inner end 220 may be a sealing member 224 such as an o-ring held within a groove 225. The sealing member 224 is preferable resilient and deformable to provide a water resistant seal for inner cavity 216. It is also anticipated that male portion 204 may include an inner cavity 221 accessed through inner end 220.

Figure 17:
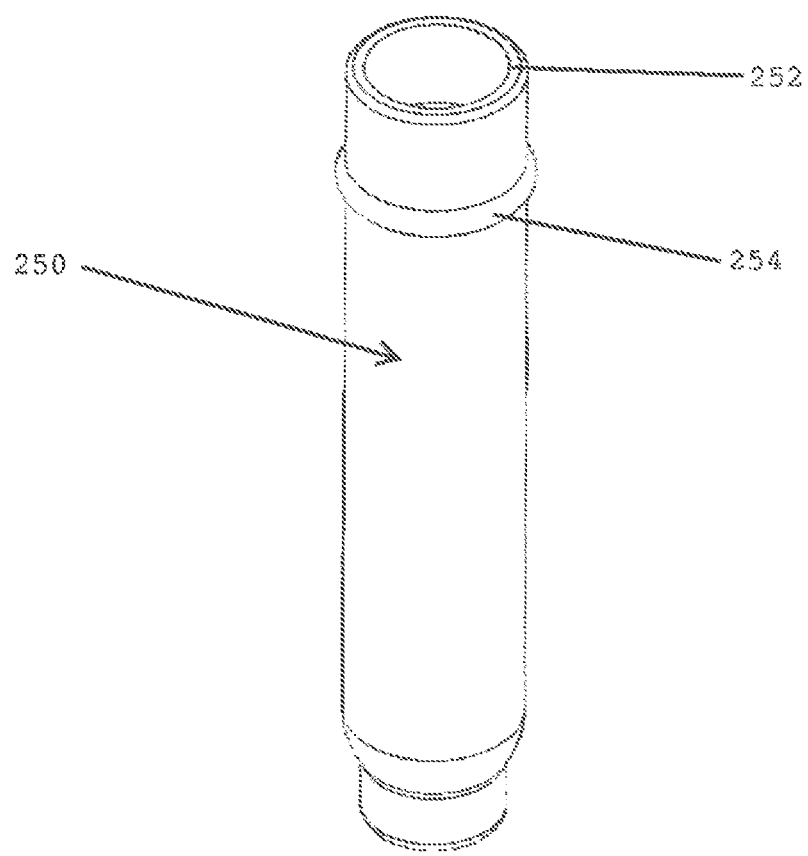
FIG. 17 is a perspective view of a first alternative embodiment of a lower body for use with the upper portion of FIG. 13.
Figure 18:
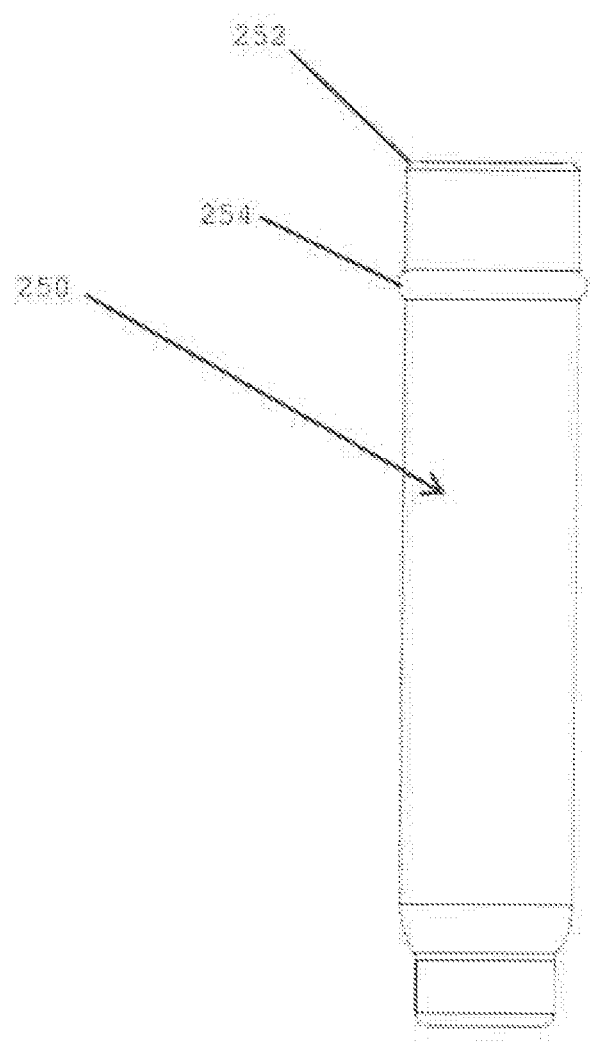
FIG. 18 is a side view of the lower portion of FIG. 17.

As shown, male portion 204 and female 202 are made of similar and possibly stiffer plastics. Since it is possible that these two elements may not be sufficiently resiliently deformable to form a water resistant joint or seal for cavity 216, sealing member 224 may be provided. If either elements is made of a more resilient deformable material that is capable of conforming to the shape and possible imperfections of the material of the other, an integral widening or narrowing as appropriate could be molded into one or both elements. This would remove the need for a separate sealing member. Such an arrangement is illustrated in FIGS. 17 and 18, with alternative embodiment male portion 250 including a widening 254 adjacent an end 252 for insertion within female portion 202.

It is further anticipated that a float according to the present disclosure can include either an outer surface of a male portion, or an inner surface of a female portion that are made of a softer, resilient material. This softer material may be positioned along the outer surface or the inner surface by any technique or method, including but not limited to co-molding, over-molding, or positioning of a secondary softer material over the male portion or within the female portion post-molding. The added softer material may permit the formation of an adequately water resistant seal or join between the male and female portions without the need for a widening of a specific portion of the male portion, or a narrowing of a specific portion of the female portion. Such methods might permit other portions of the male and/or female portions to be made of a stiffer, less resilient, and possibly more rugged material that might not otherwise be possible when that portion needed to be made entirely from a softer material.

Further, it is also anticipated that the location of the portions of the male and female elements that form the water resistant join between the two elements need not be exclusively adjacent the outer end of the female portion. The sealing member may be positioned so that the water resistant join is located deeper within the female portion.

Figure 48:
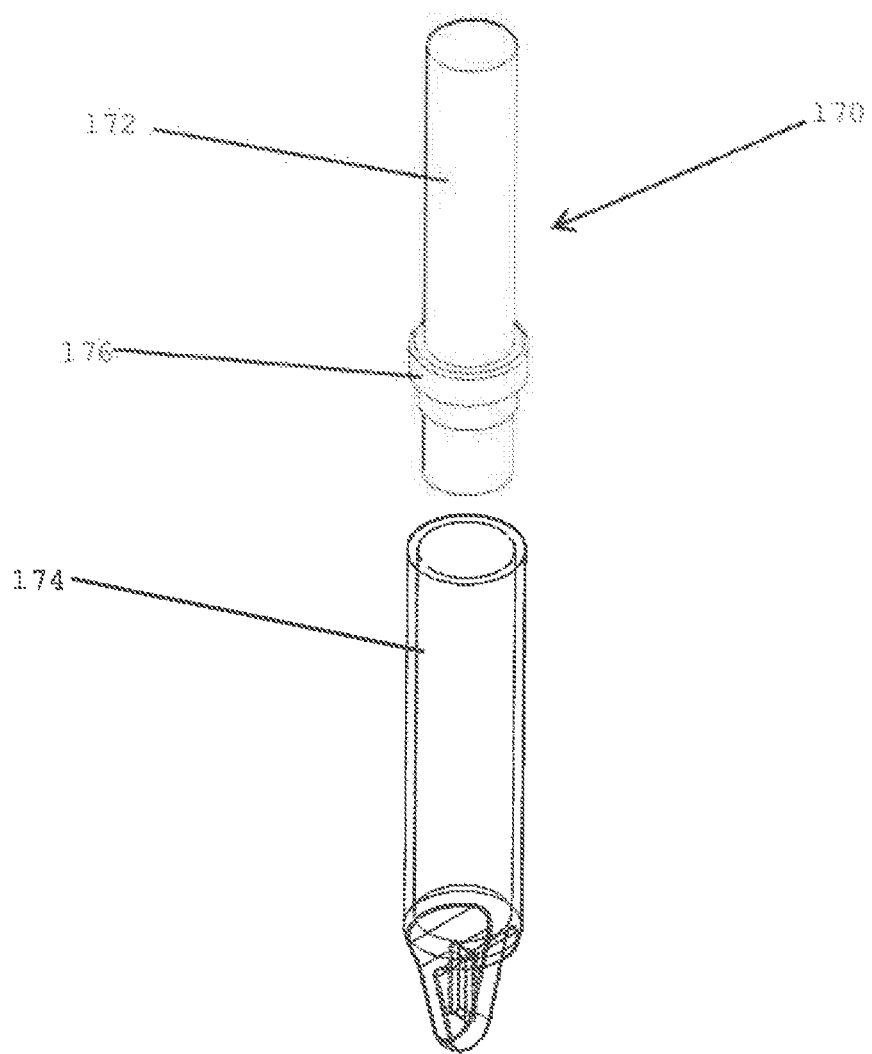
FIG. 48 is an exploded perspective view of a seventh alternative embodiment of an adjustable float according to the present disclosure.

Alternatively, as shown in FIG. 48, a float 170 may include a male portion or insert 172 configured to be received within a female portion or lower body 174. A separate sealing member 176 may be positioned about insert 172. Sealing member 176 is preferably made of a material sufficiently resilient and deformable enough to provide a seal against both an outer wall of insert 172 and an inner wall of lower body 174. This sealing member 176 may permit one or both of insert 172 and lower body 174 to be made of a firmer, less resilient material that may be potentially more durable, cheaper, or desirable for other reasons while still providing an adequate seal between the male and female portions. The addition of sealing member 176 may be accomplished through positioning the member about insert 172 or by inserting the member within lower body 174. Alternatively, the sealing member may be included as part of float 170 by molding the member within lower body 174. Other methods of construction of float 170 or positioning of sealing member 176 are anticipated as within the scope of the present disclosure.

Figure 19:
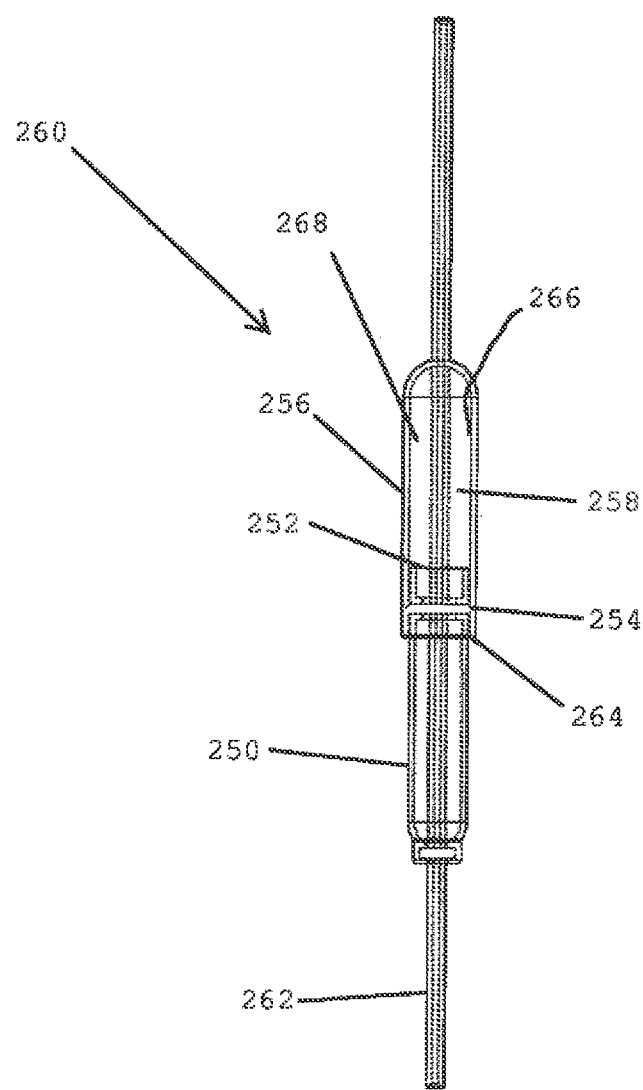
FIG. 19 is a perspective view of a second alternative embodiment of a lower body for use with the insert of FIG. 7, according to the present disclosure.

The combination of male portion 250 and a female portion 256 is illustrated in FIG. 19 as float 260. An inner end 252 of male portion 250 is passed through an open end 264 of female portion 256 so that widening 254 engages an inner wall 266 within a cavity 268. This embodiment is intended to permit the fishing line to pass through a central tube 262 that may extend above and below the male and female portions. An air space 258 is formed within float 260 and the volume of air space 258 may be adjusted as desired by moving male portion 250 further into or further out of female portion 256. It is anticipated that tube 262 may be located generally along a centerline of the float or may be positioned at an offset location or even along an outer wall of one or both of the male and female portions.

Figure 20:
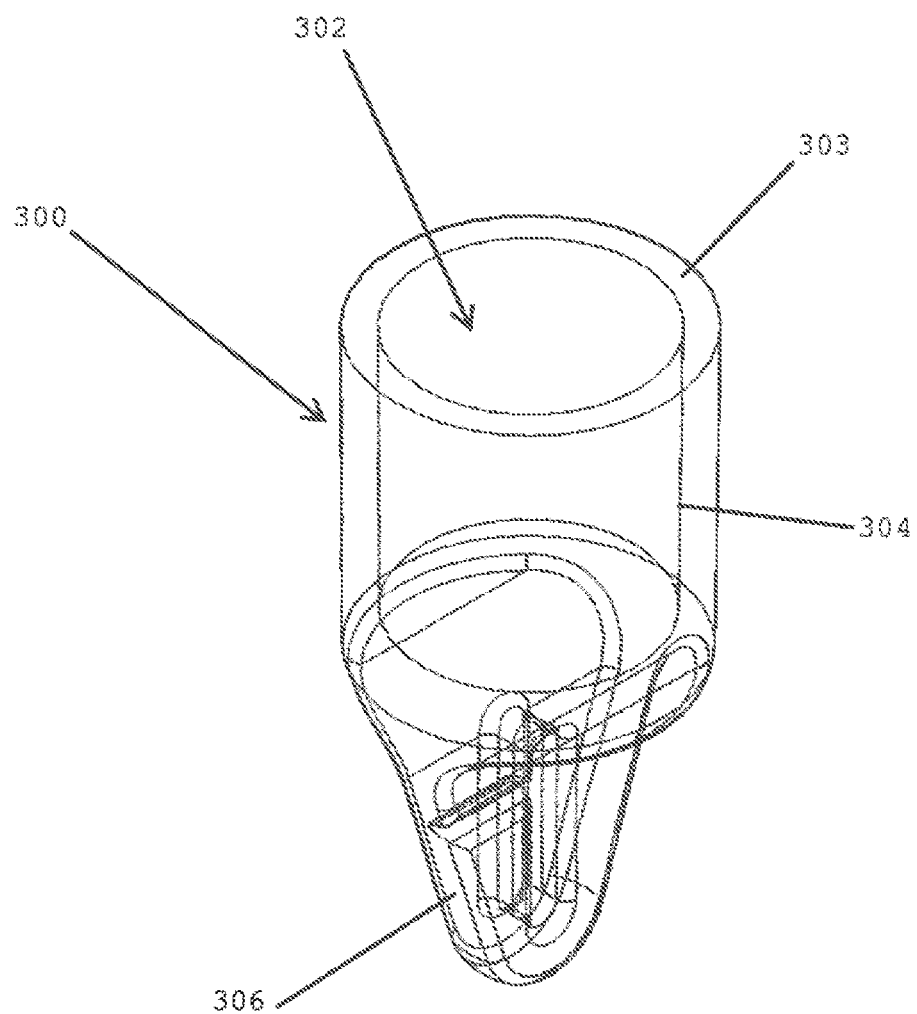
FIG. 20 is a side view of the lower body of FIG. 19.
Figure 21:
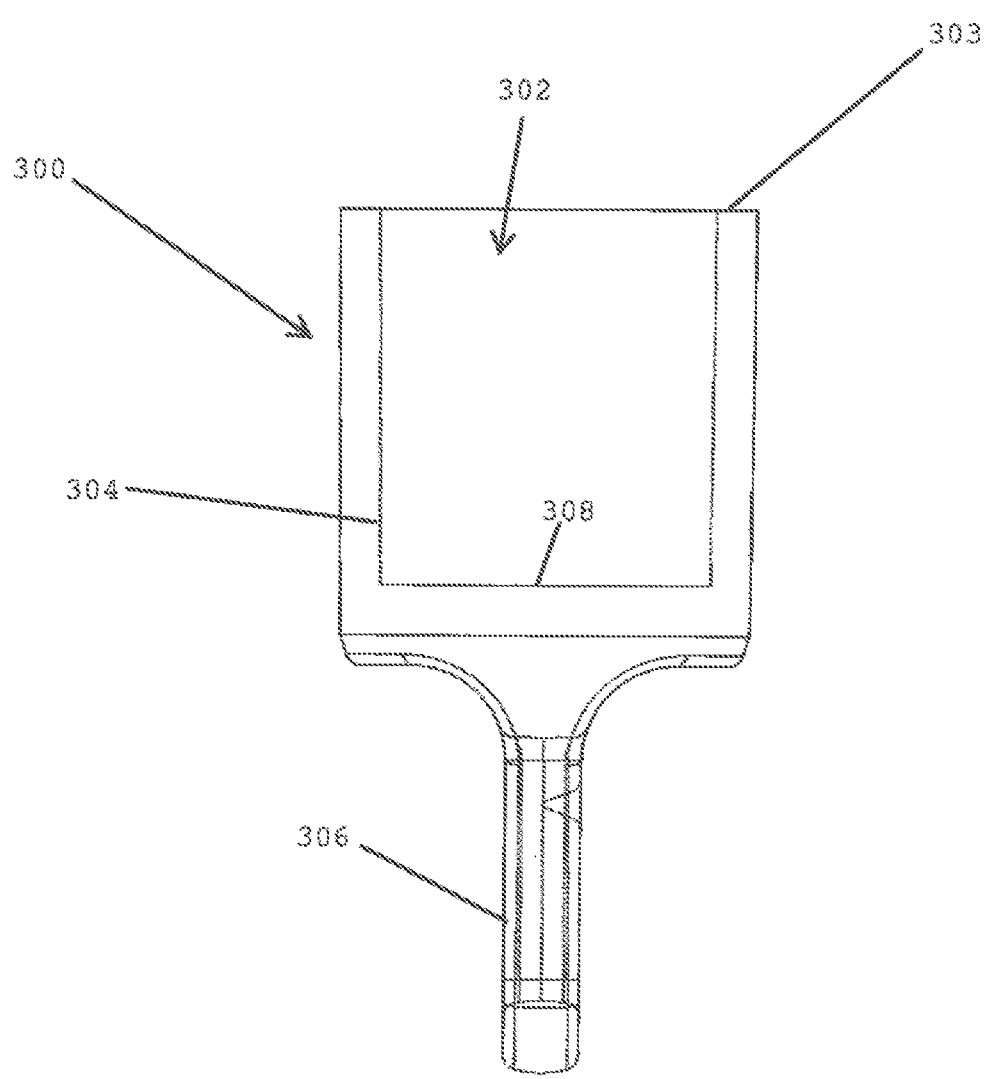
FIG. 21 is a second side view of the lower body of FIG. 19, taken approximately ninety degrees from the view in FIG. 20.
Figure 22:
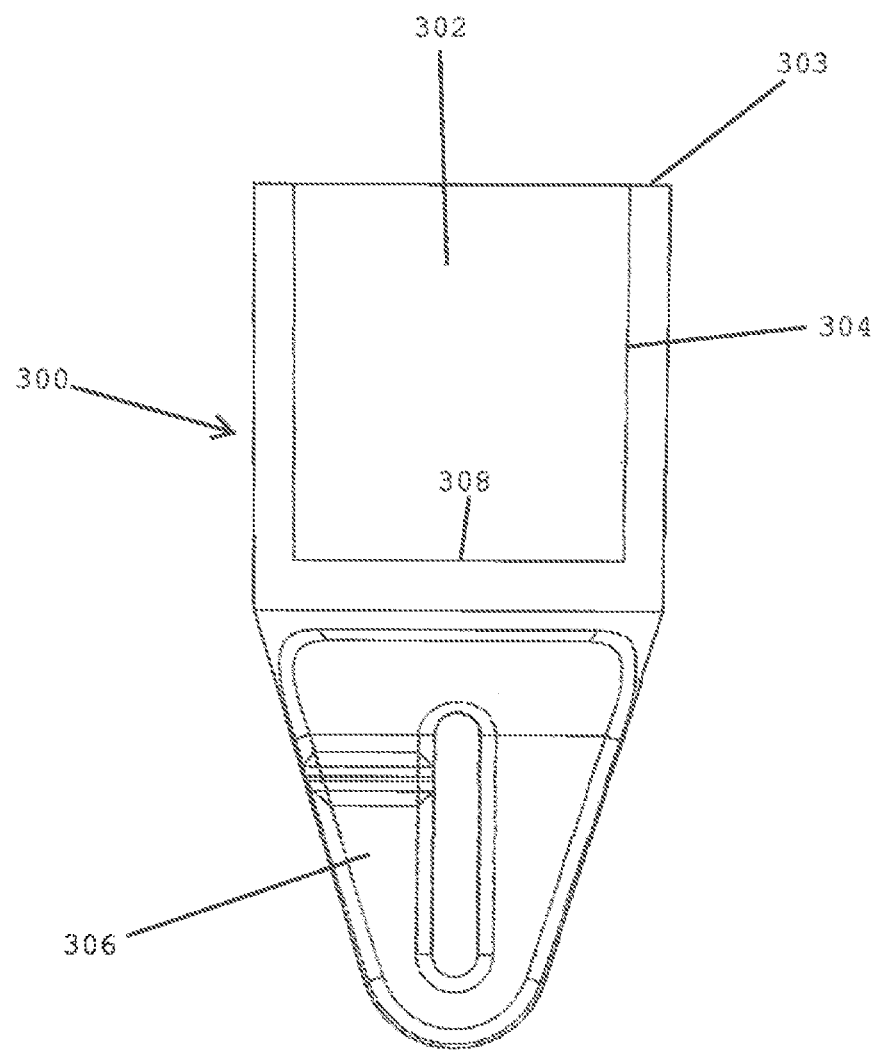
FIG. 22 is a side view a second alternative embodiment of an adjustable float according to the present disclosure.
Figure 23:
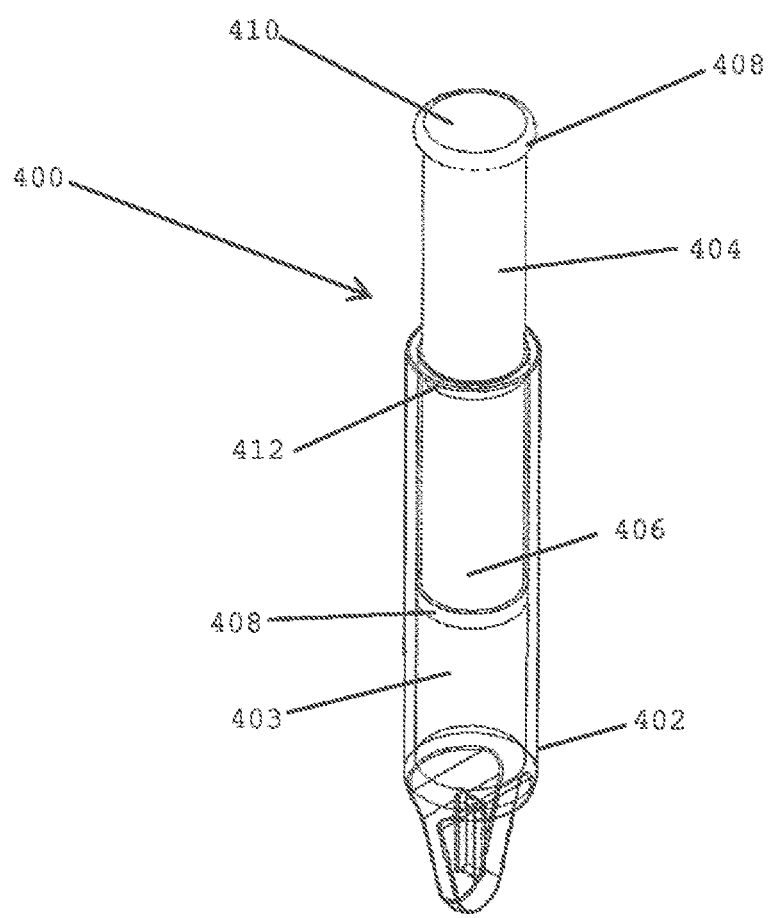
FIG. 23 is a perspective view of a third alternative embodiment of an adjustable float according to the present disclosure.
Figure 24:
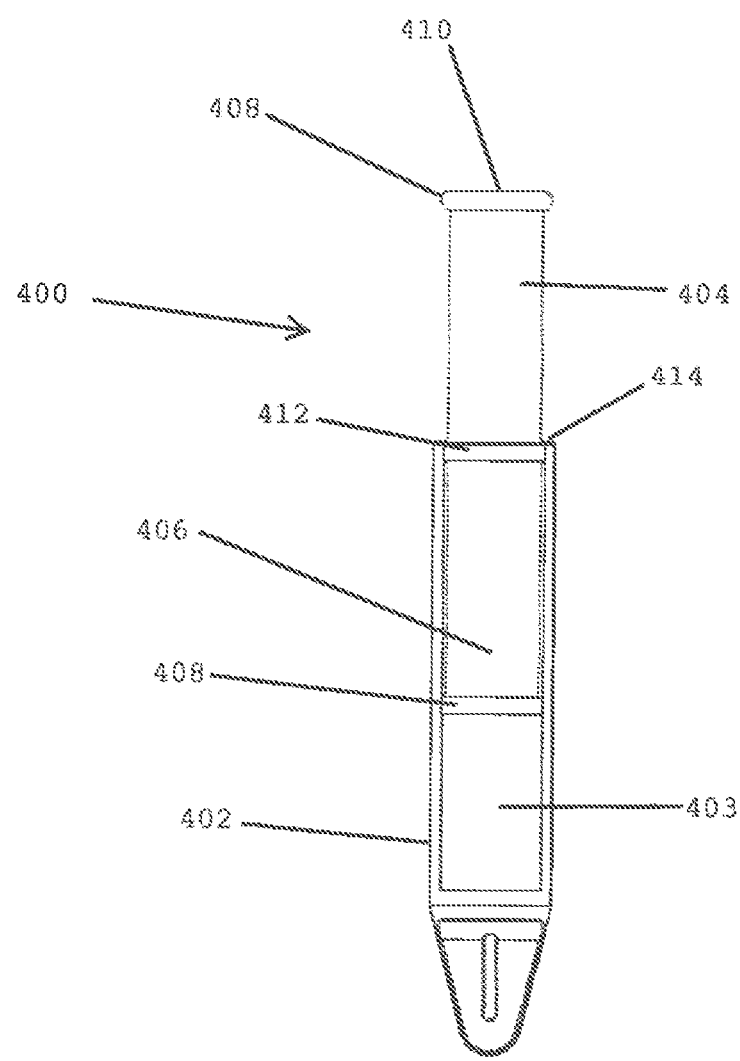
FIG. 24 is a side view float of FIG. 23.
Figure 25:
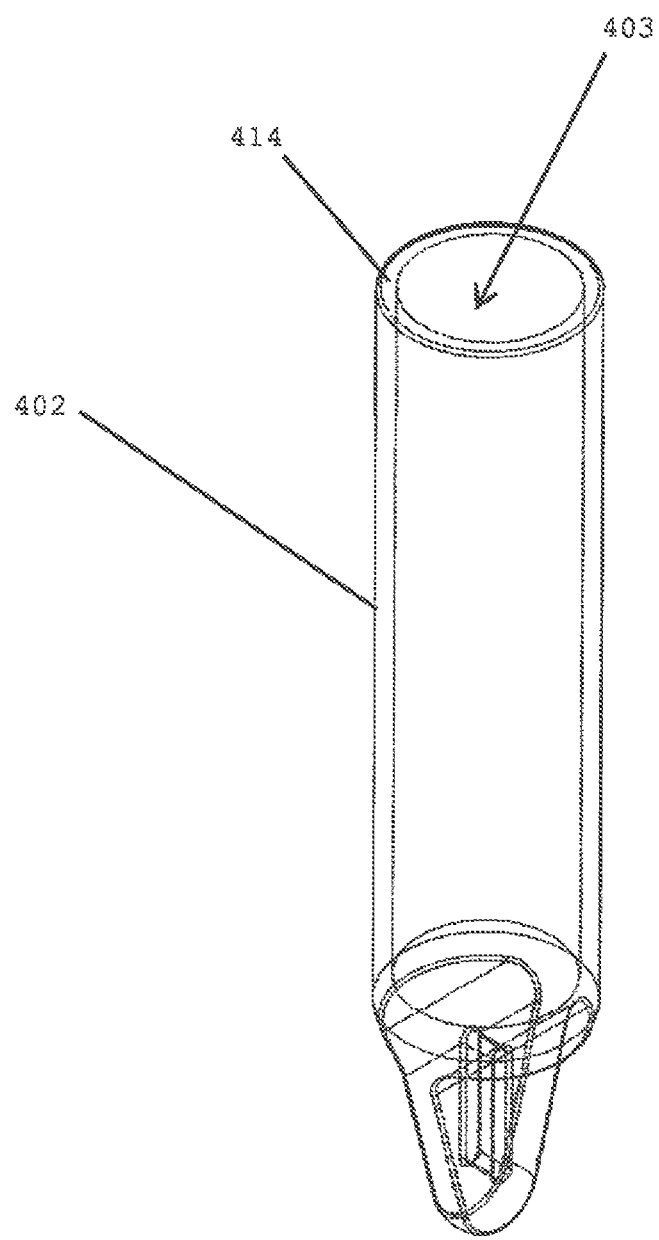
FIG. 25 is a perspective view of a lower body of the float of FIG. 23.
Figure 26:
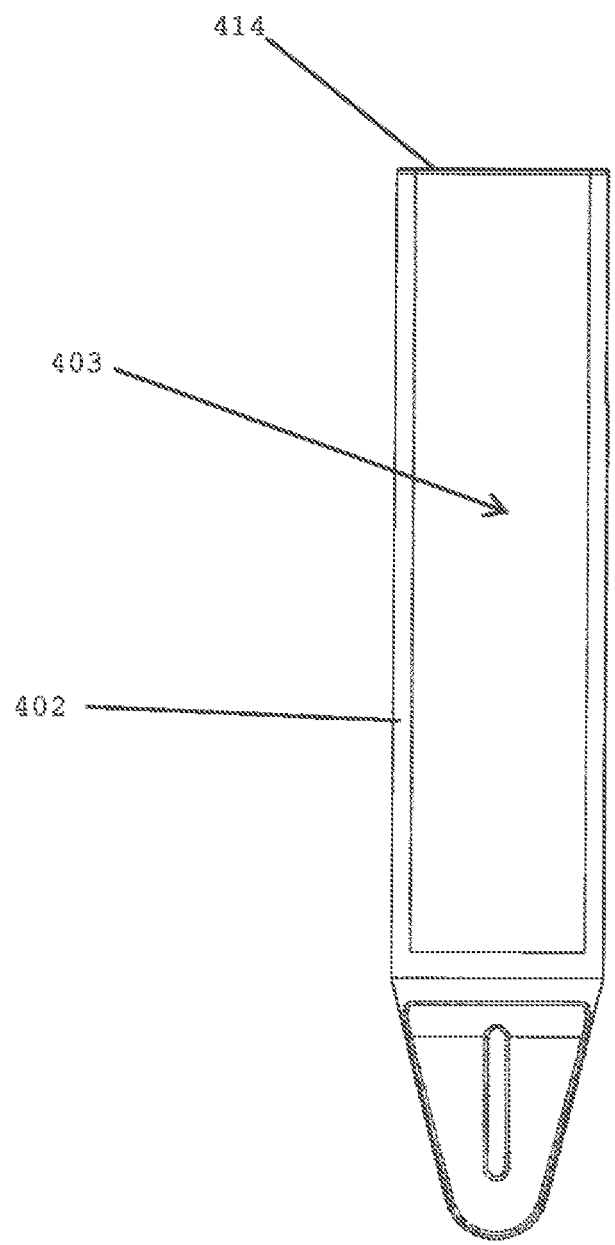
FIG. 26 is a side view of the lower body of FIG. 25.
Figure 27:
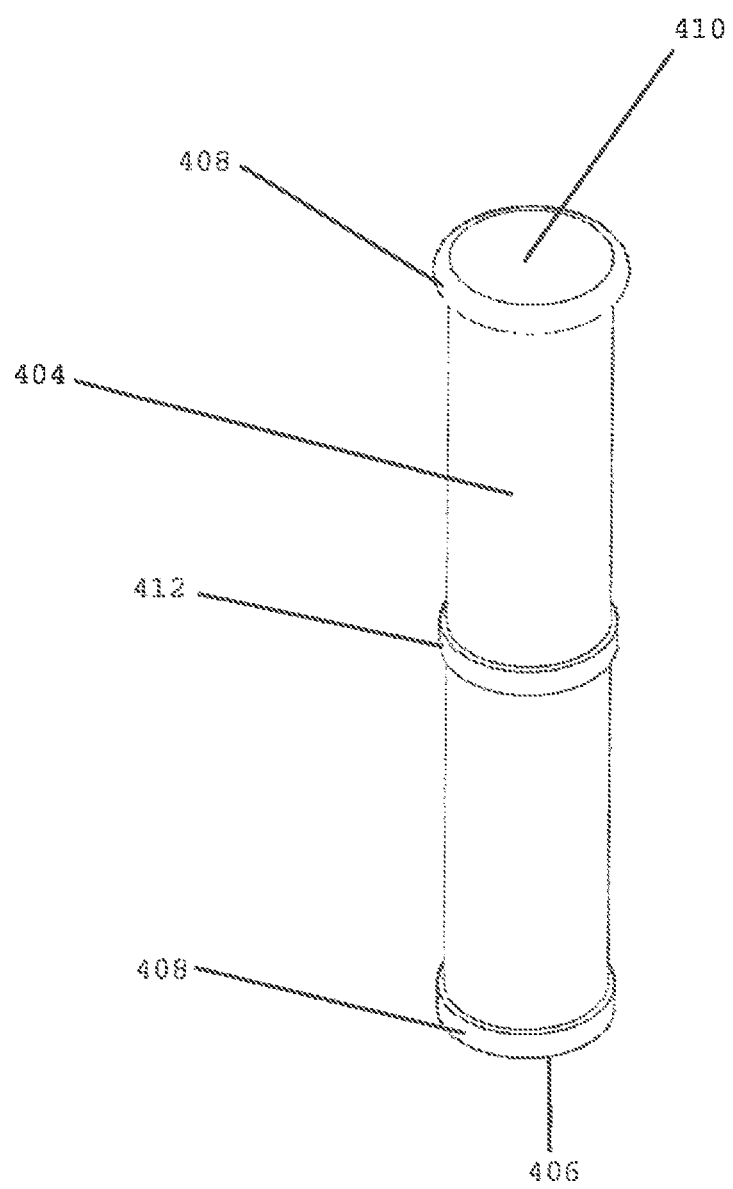
FIG. 27 is a perspective view of an insert of the float of FIG. 23.
Figure 28:
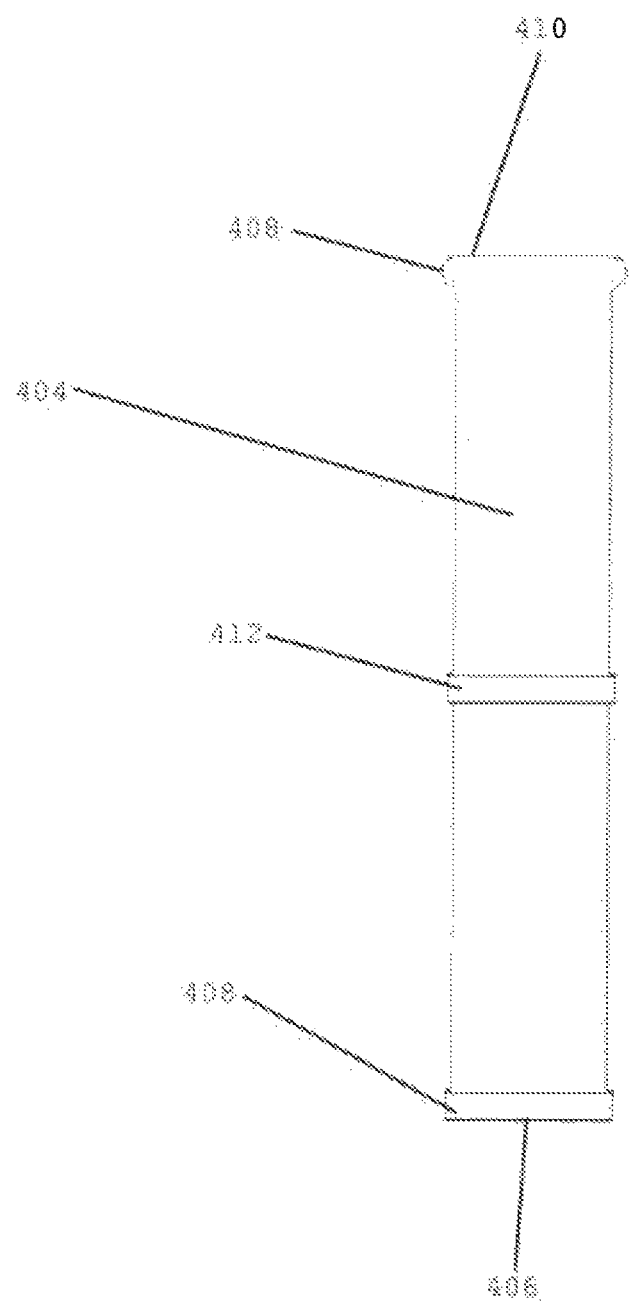
FIG. 28 is a side view of the insert of FIG. 27.
Figure 29:
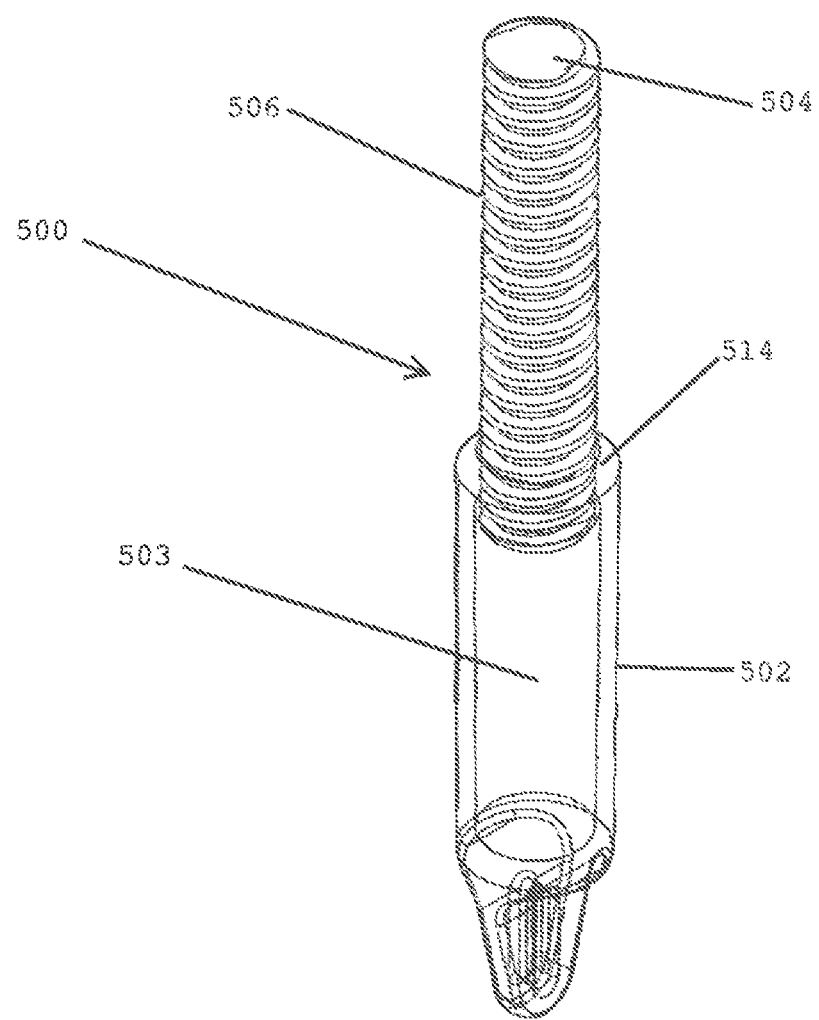
FIG. 29 is a perspective view of a fourth alternative embodiment of an adjustable float according to the present disclosure.
Figure 30:
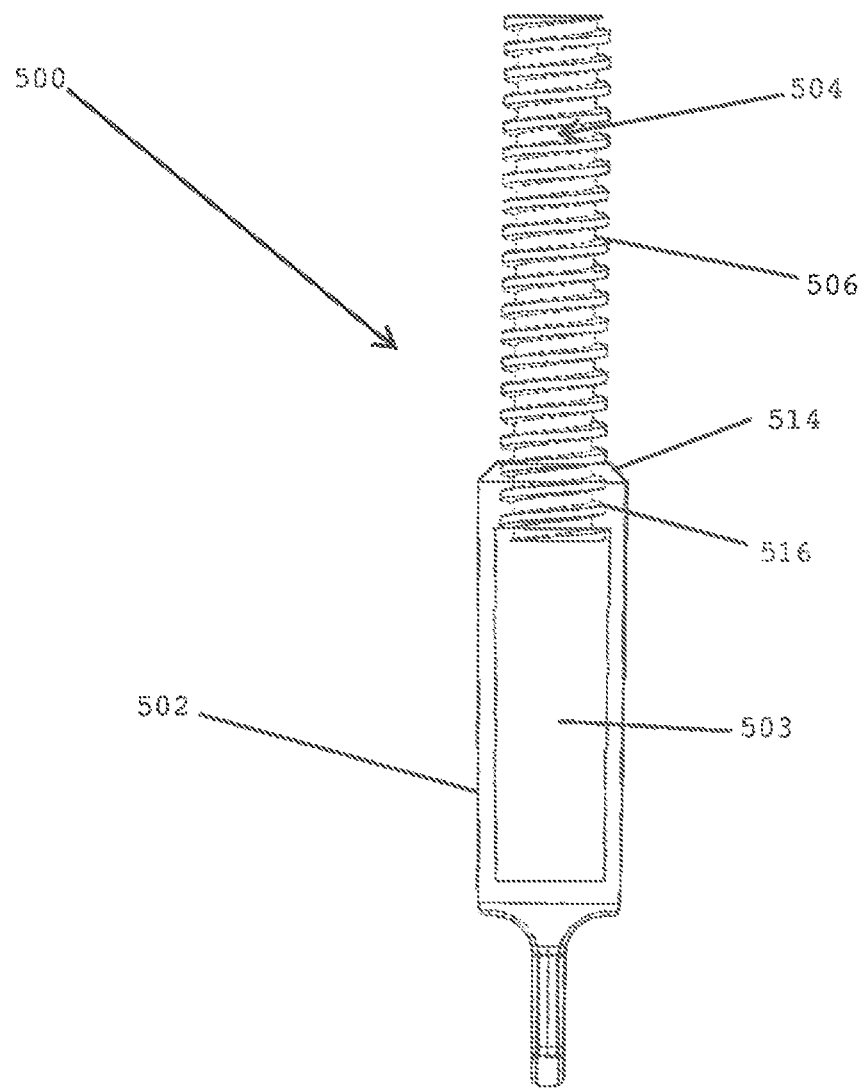
FIG. 30 is a side view of the float of FIG. 29.
Figure 31:
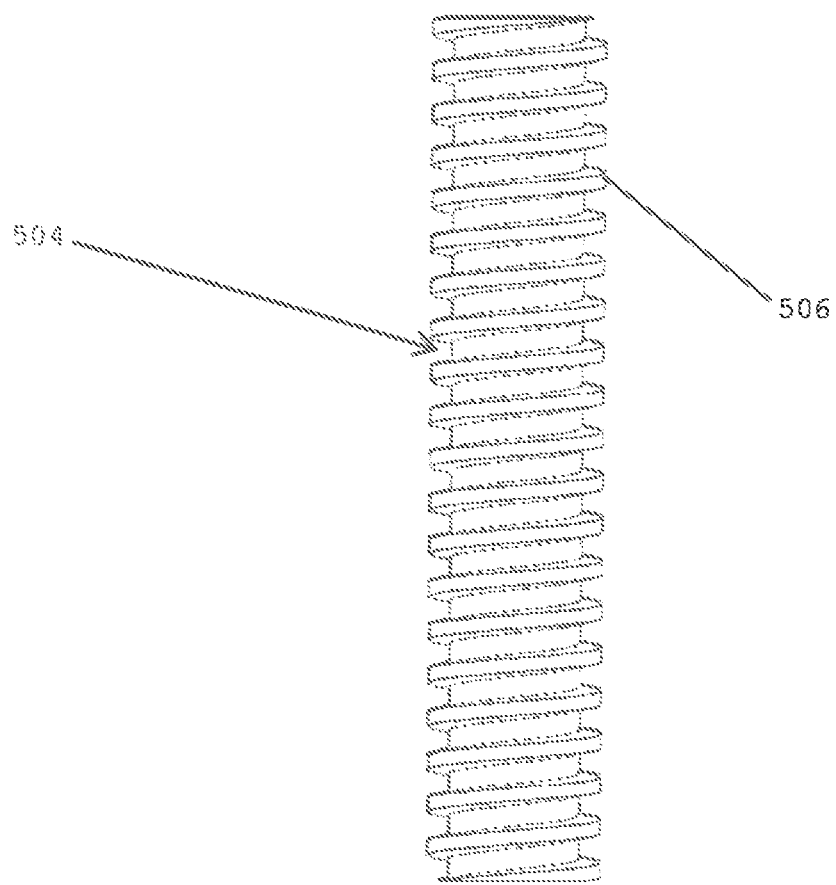
FIG. 31 is a side view of an insert for use with the float of FIG. 29.
Figure 32:
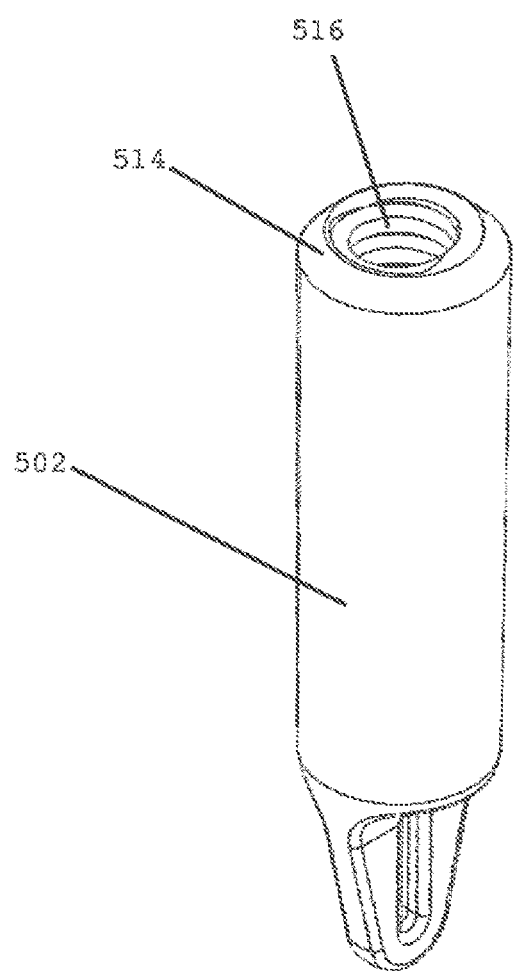
FIG. 32 is a perspective view of a lower body for use with the float of FIG. 29.

FIGS. 20 to 22 illustrate a base cap 300 for use with insert 104 to provide an adjustable float 310.

It should be noted that throughout the present disclosure, it is anticipated that the relative position of the elements (e.g., lower body) is illustrative only and is not intended to limit the present disclosure to one particular arrangement. Provided that the relationship of the join between the elements of floats according to the present disclosure is maintained, it is anticipated that the male and female parts may be either above or below the corresponding mating part.

Referring now to FIGS. 23 to 28, a further alternative embodiment of a float 400 according to the present disclosure is shown. Float 400 includes a lower body 402 and an insert 404. Instead of having a narrowing of an inner cavity 403 of lower body 402 to provide a water resistant join between the two elements, insert 404 may include one or a plurality of wider portions or detents such as a wider portion 408 adjacent the inner end 406, and may also include a intermediate wider portion 412 positioned along insert 404 between inner end 406 and an outer end 410. Outer end 410 may also have a wider portion 408 and insert 404 may be inverted so that outer end 410 is inserted within lower body 402. The illustrated shape of the wider portions 408 and 412 is not intended to limit the shape of such elements within the scope of the present disclosure. The shape of the wider portions may be selected from whatever shape works best with the materials chosen to make the male and female portions and the size of these portions.

With wider portion 408 adjacent the ends of insert 404, at least a portion of the water resistant join between lower body 402 and insert 404 may be located within inner cavity 403 at a location distant from an outer end 414 of lower body 402. The inclusion of one or more intermediate wider portions 412 may provide a visual as well as tactile reference as to the depth of insertion or position of insert 404 within lower body 402. This might allow lower body 402 to be made without any outer labels or indicia and also permit the lower body to be made of an opaque material instead of a transparent or translucent material. If multiple intermediate wider portions 412 are included, then the different wider portions may provide a plurality of references for desired or standard levels of buoyancy. If wider portions 412 are spaced appropriately, insert 404 may be reversed with outer end 414 inserted within lower body 402 and the wider portions 412 may indicate different levels of buoyancy than would be provided with inner end 406 inserted within lower body 402.

It is also anticipated that float 100 may include more than one narrowing 124 may be included within lower body 102 to provide water resistant joins between insert 104 and lower body 102 at multiple levels within float 100 as insert 104 is pushed deeper within lower body 102.

Referring now to FIGS. 29 to 32, a further alternative embodiment of a float 500 according to the present disclosure is shown. Float 500 includes a lower body 502 with an outer end 514 having threads 516 formed adjacent the outer end and within an inner cavity 503 and an insert 504 which includes mating threads 506 along an outer surface. Threads 506 and 516 are sized with respect to each other to form a water resistant join when mated to each other. The position of insert 504 within lower body 502, and thus the buoyancy of float 500 may be changed by rotating the two elements with respect to each other.

Figure 33:
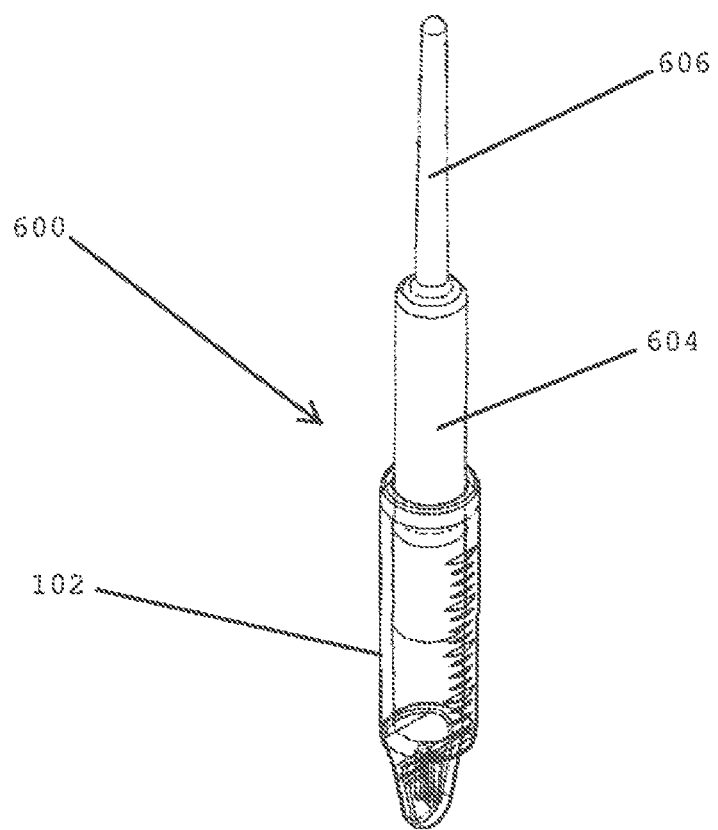
FIG. 33 is a perspective view of a fifth alternative embodiment of an adjustable float according to the present disclosure.
Figure 34:
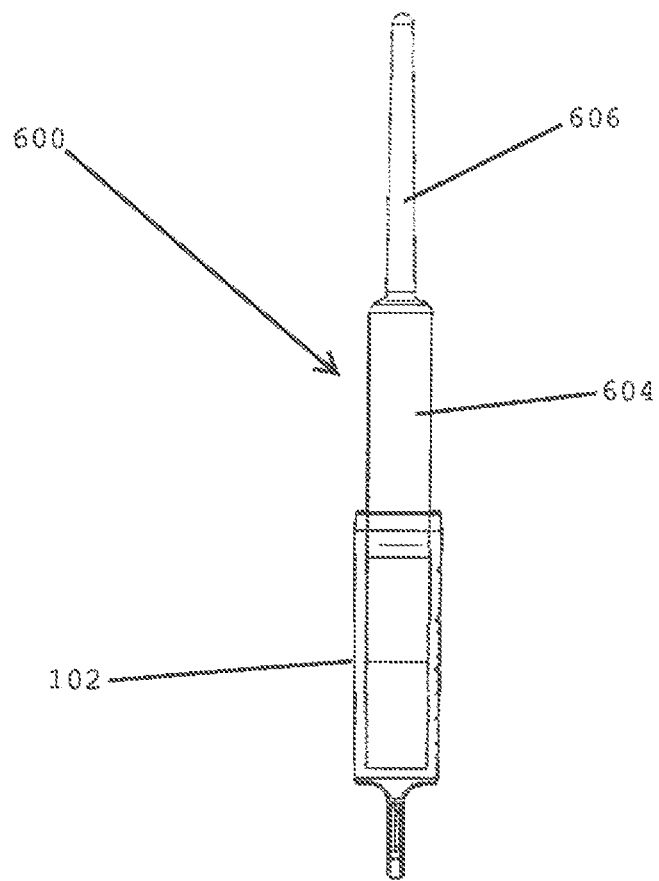
FIG. 34 is a side view of the float of FIG. 33.
Figure 35:
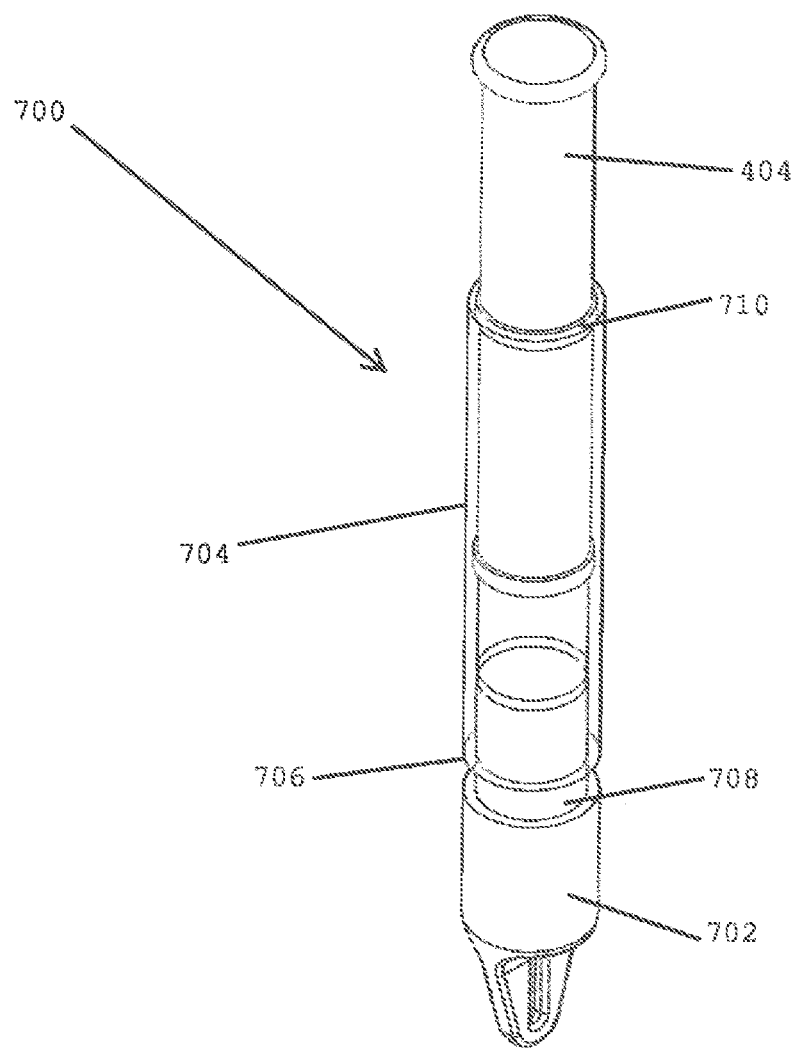
FIG. 35 is a perspective view of a renewal arrangement according to the present disclosure for use with a conventional float.
Figure 36:
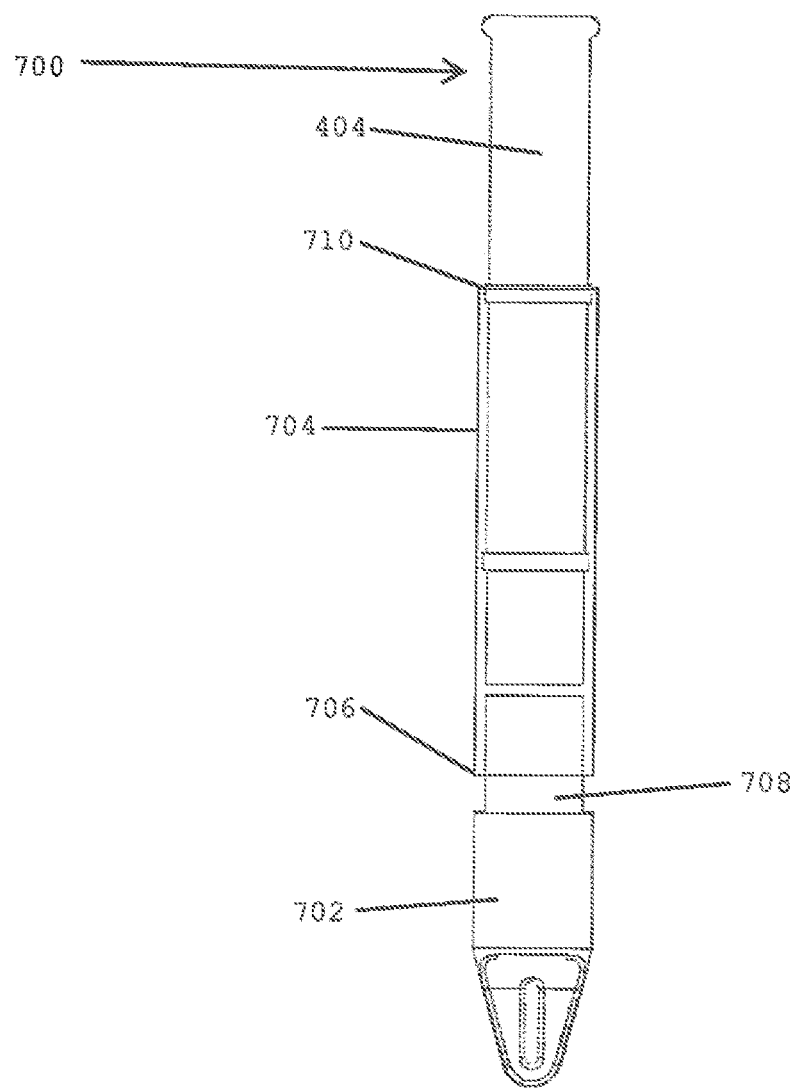
FIG. 36 is a side view of the renewal arrangement of FIG. 35.
Figure 37:
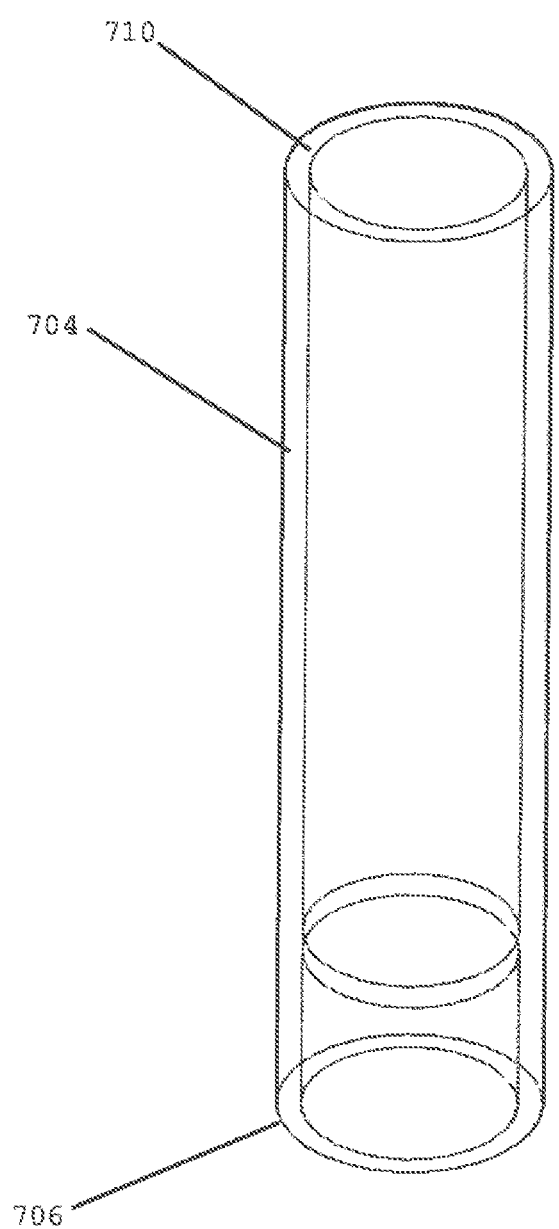
FIG. 37 is a perspective view of an adapter for use with the renewal arrangement of FIG. 35.
Figure 38:
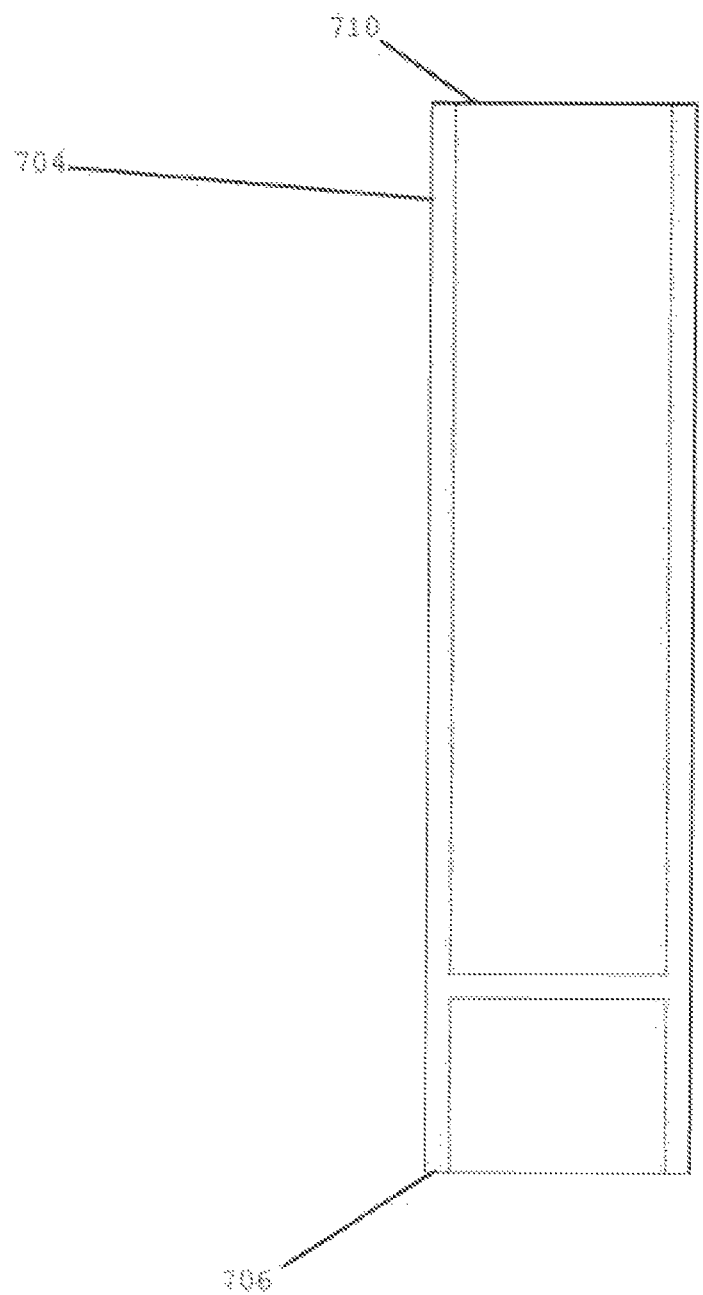
FIG. 38 is a side view of the adapter of FIG. 37.

FIGS. 33 and 34 illustrate a further alternative embodiment 600 with lower body 102 engaging an insert 604 with an extended top portion 606 to serve as a strike indicator. While not solely limited to warmer weather use, float 600 is not intended for primary use in ice fishing.

As noted above, a conventional approach to providing a float whose buoyancy may be altered, albeit permanently, by cutting a foam insert to a desired length. FIGS. 35 to 38 illustrate a renewal kit 700 that may be mated with the known conventional device 702 to provide the adjustable features according to the present disclosure. Kit 700 may include an insert 404 with an adapter 704. Adapter 704 includes a first end 706 for receiving a remaining foam portion 708 of device 702 for securing the adapter to device 702. Insert 404 may then be inserted within a second open end 710 to function in a fashion similar to that described above.

Figure 47:
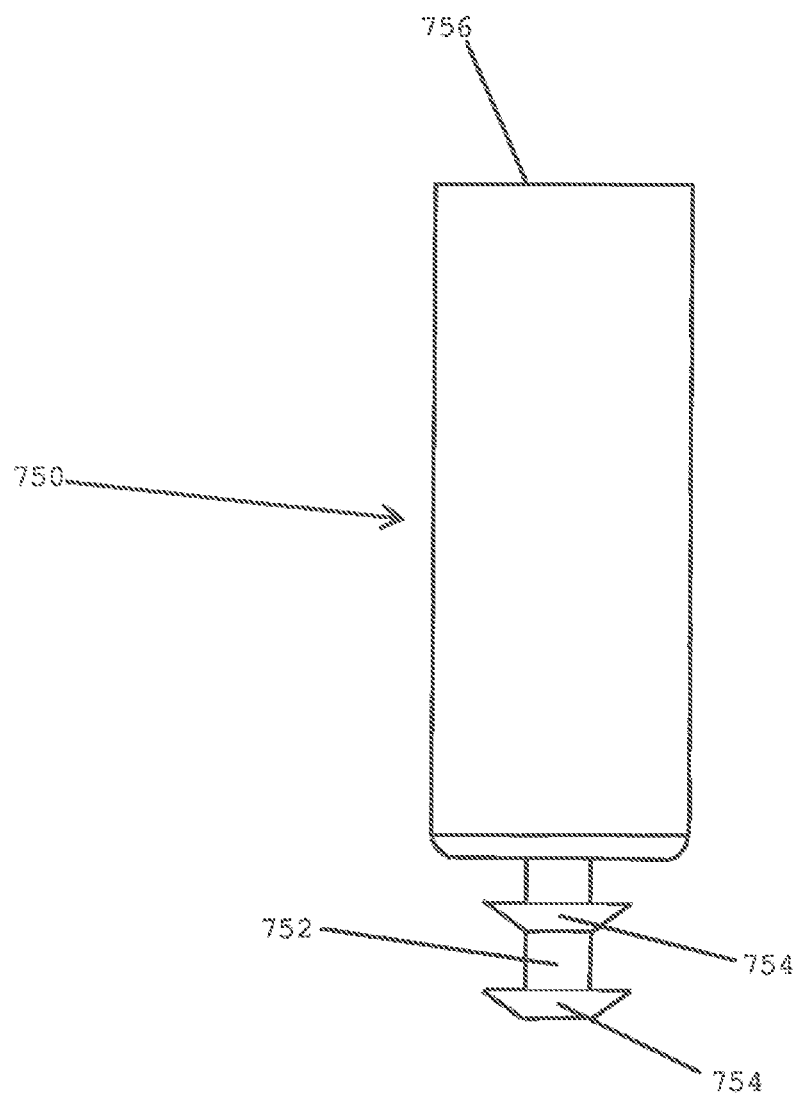
FIG. 47 is a side view of an alternative embodiment of an adapter for a renewal arrangement according to FIG. 35 and the present disclosure.

FIG. 47 illustrates a second embodiment of a renewal adapter 750 for use with device 702. Adapter 750 is configured to use when remaining foam portion 708 is not sufficient or has been damaged to extensively to provide an adequate securement to the renewal adapter. With adapter 750, any remaining foam portion 708 would be removed from device 702 and a mating end 752 of adapter 750 would be inserted into device 702 in the opening where foam portion 708 would have been positioned. Mating end 752 may have one or more mating elements 754 to are configured to engage device 702 without the need for additional mechanical or chemical fasteners. Alternatively, mating end 752 may be configured to work most effectively in conjunction with a mechanical or chemical fastener such as an adhesive, screw, barb, or some other fastening element. Insert 404 may then be inserted into an open end 756 to form an adjustable float according to the present disclosure.

Figure 40:
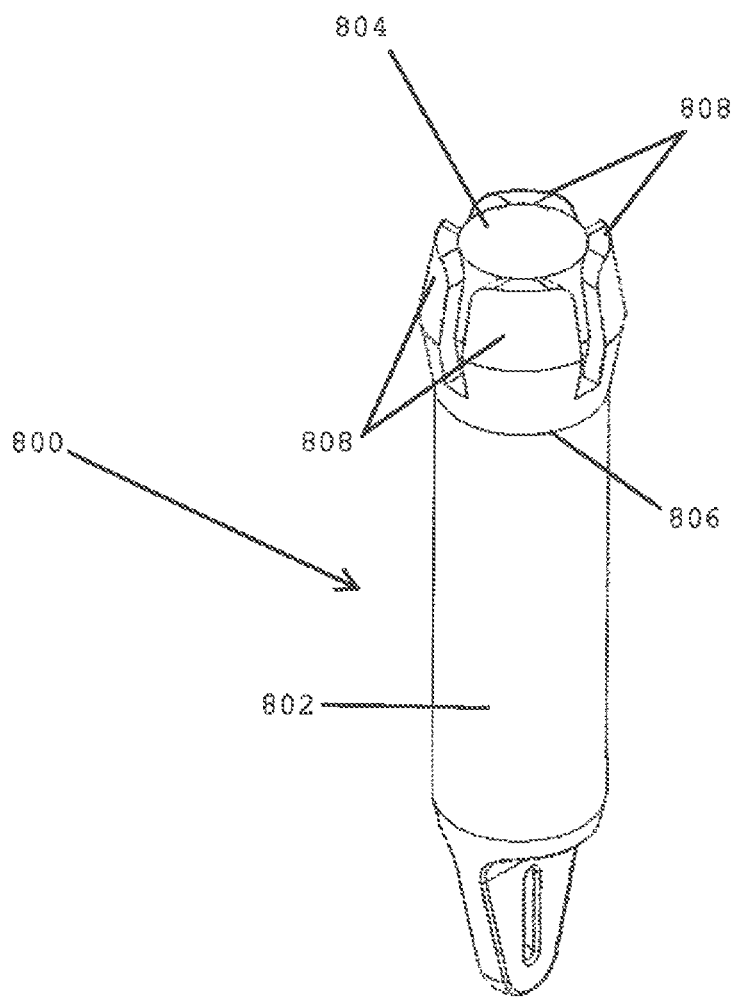
FIG. 40 is a perspective view of a fifth alternative embodiment of an alternative embodiment of an adjustable float according to the present disclosure.
Figure 41:
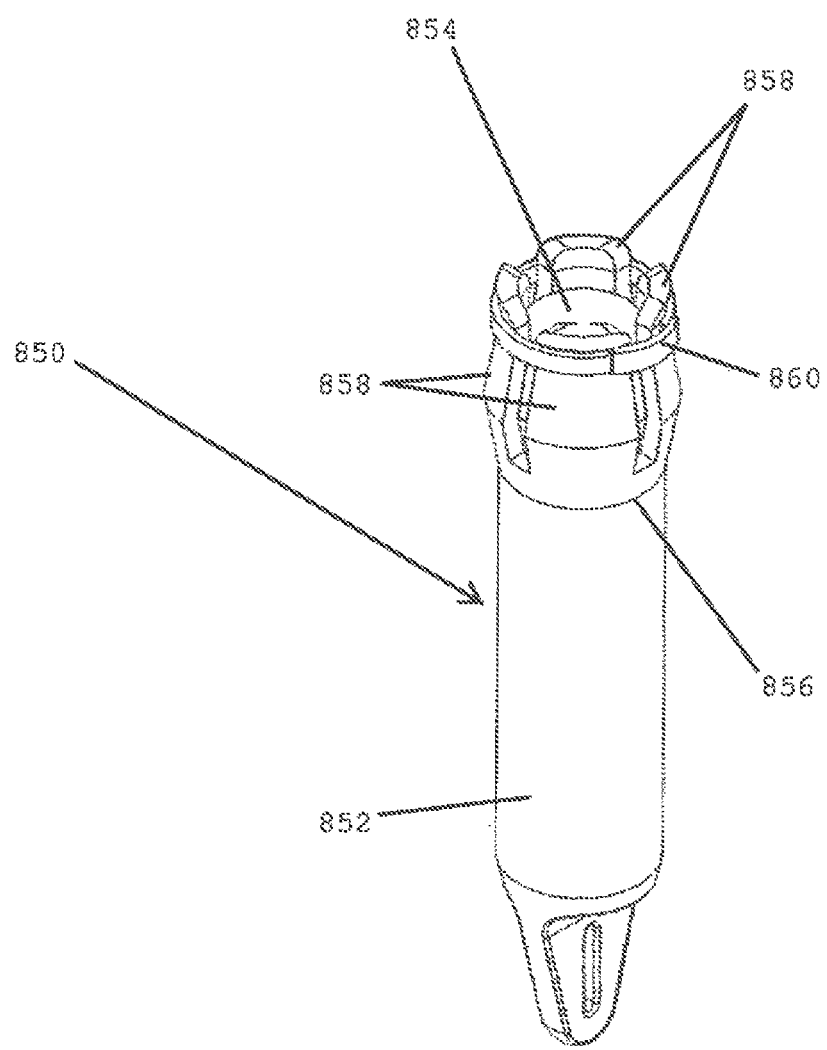
FIG. 41 is a perspective view of a sixth alternative embodiment of an adjustable float according to the present disclosure.

FIGS. 40 and 41 illustrate two alternative embodiments of adjust floats 800 and 850 according to the present disclosure. Float 800 includes a lower body 802 and an insert 804 positioned within an open end 806 of lower body 802. Between lower body 802 and insert 804 a water resistant join is formed as discussed above to allow for alterations of buoyancy of float 800. To deter movement Of insert 804 with respect to lower body 802 once the desired degree of buoyancy has been selected, a plurality of fingers 808 may extend from lower body 802 about open end 806. These fingers are preferably arranged to define a space that is slightly narrower than insert 804 so that the fingers exert force on the insert to hold it in position.

Similarly, float 850 includes a lower body 852 and an insert 854 positioned within an open end 856 of lower body 852. A plurality of fingers 858 extend from lower body 852 adjacent open end 856. To urge fingers 858 against insert 854 told hold the insert in a desired position, a releasable clamping member 860 may be provided about an outer surface of the fingers. Member 860 may be a simple o-ring made of an elastic material that is released by pushing the fingers outward against the elastic to release the float or the o-ring may be removed to permit movement of the insert. Alternatively, member 860 may be a strap or other mechanism with a cam lock or other releasable clamping arrangement to permit the member to be selectively tightened or released about fingers 858.

It is anticipated that the use of extensions from a lower body to engage and deter movement of the insert may be used on embodiments with smooth-sided inserts, inserts with wider portions and threaded inserts, within the scope of the present disclosure.

Figure 49:
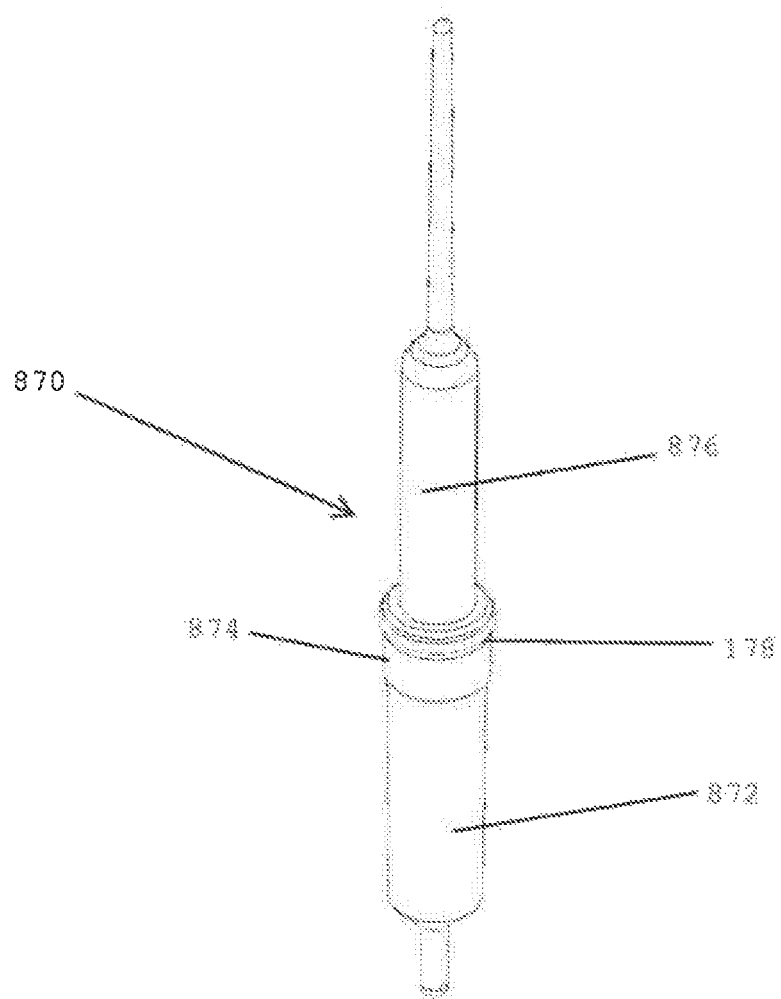
FIG. 49 is a perspective view of a eighth embodiment of an adjustable float according to the present disclosure.

A further embodiment of an adjustable float 870 is illustrated in FIG. 49. Float 870 includes a lower body or portion 872 with a top end 874 into which an insert 876 may be positioned as described in the present disclosure. An outer constraining member 178 may be provided about an outer wall of lower portion 872 adjacent top end 874. Instead of relying of fingers extending from top end 874, lower body 872 is preferably made of a softer deformable material adjacent top end 874 that constraining member 876 is capable of deforming inward to aid in the formation of a water resistant join between the two portions and also deterring movement of the male portion within the female portion.

Figure 42:
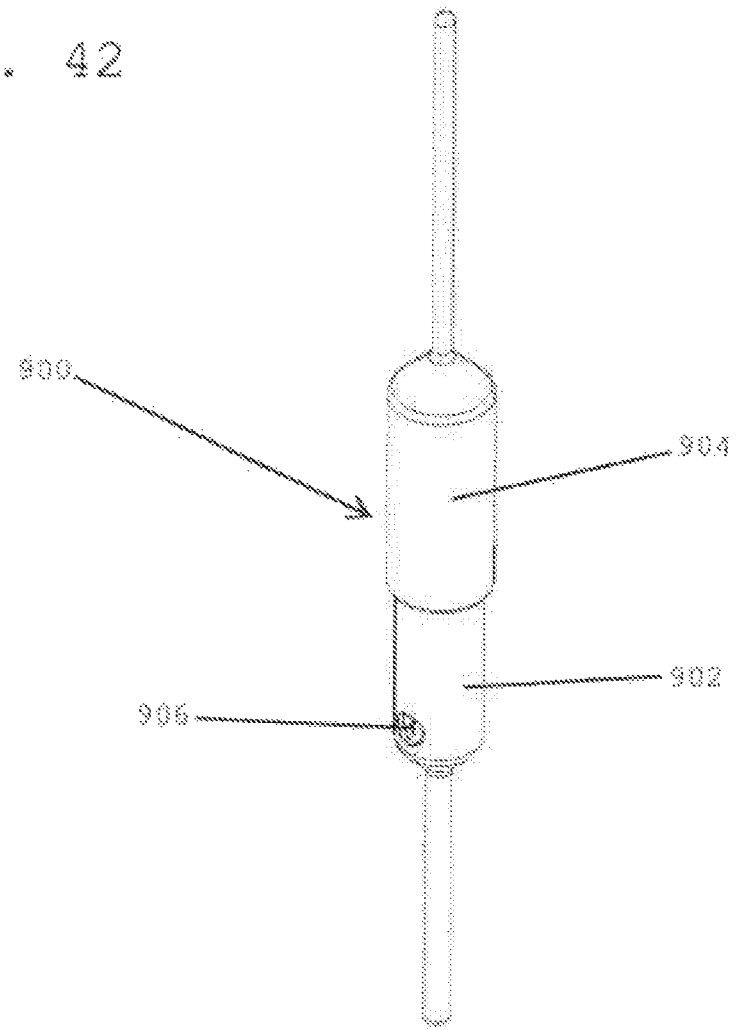
FIG. 42 is a perspective view of an adjustable float according to the present disclosure with an automatic air release valve.
Figure 43:
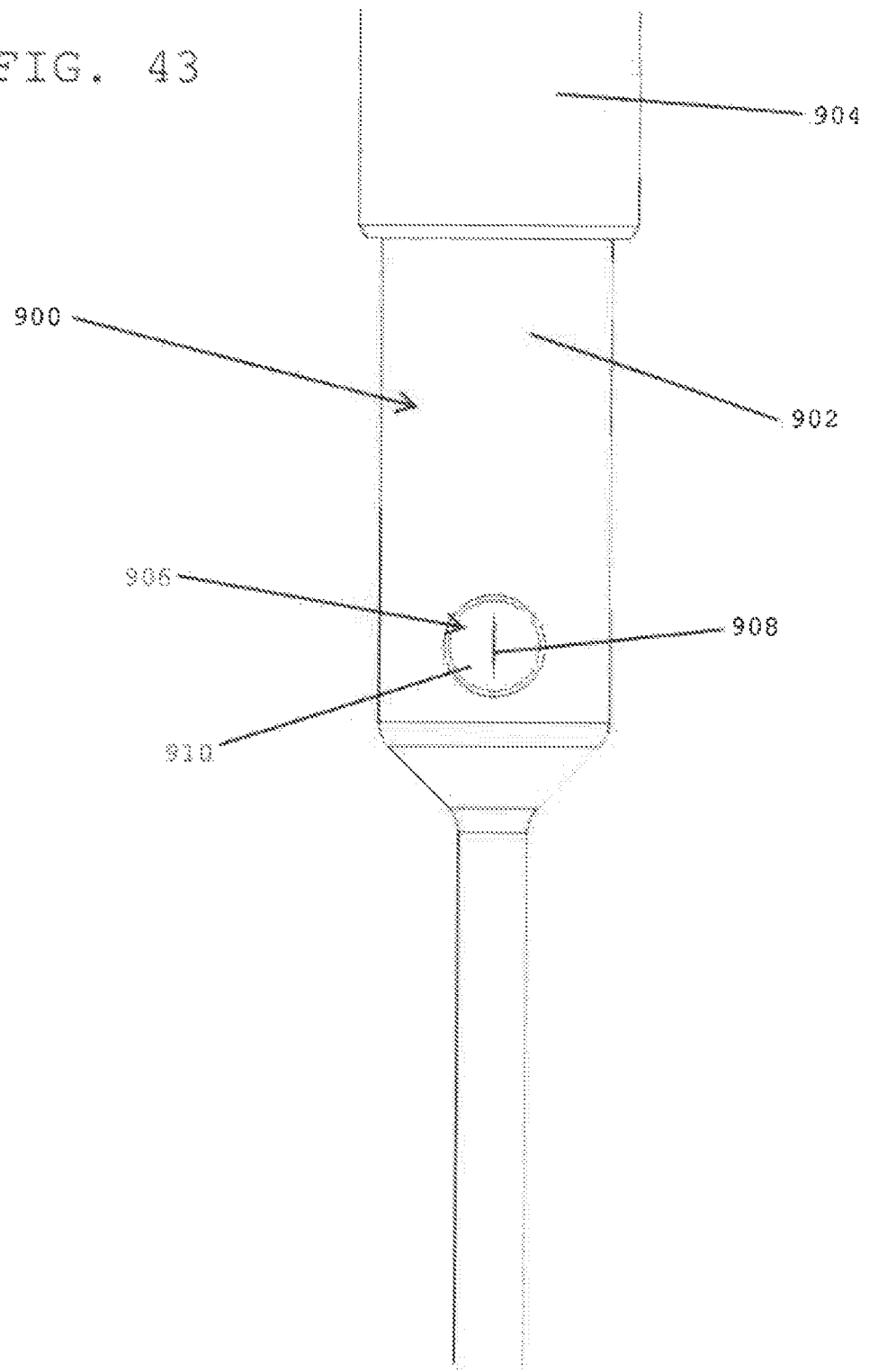
FIG. 43 is a side view of the float of FIG. 42, showing a closer view of the automatic air release valve.

FIGS. 42 and 43 illustrate a further embodiment of an adjustable float 900 according to the present disclosure. Due to the water resistant join between the male and female portions of the floats according to the present disclosure, it may be desirable to provide a way to allow air to enter or leave the interior air space when the buoyancy of the float is adjusted. Float 900 includes a male portion 902 received within a female portion 904 and provides a valve 906 in communication with an interior air space defined between the male female portions. Valve 906 is shown as part of male portion 902 but may also be included as part of female portion 904.

Valve 906 is shown as an automatic valve which will respond to increases or decreases in air pressure within the float by allowing air to exit or enter the float through an opening 908 in a diaphragm 910.

Figure 44:
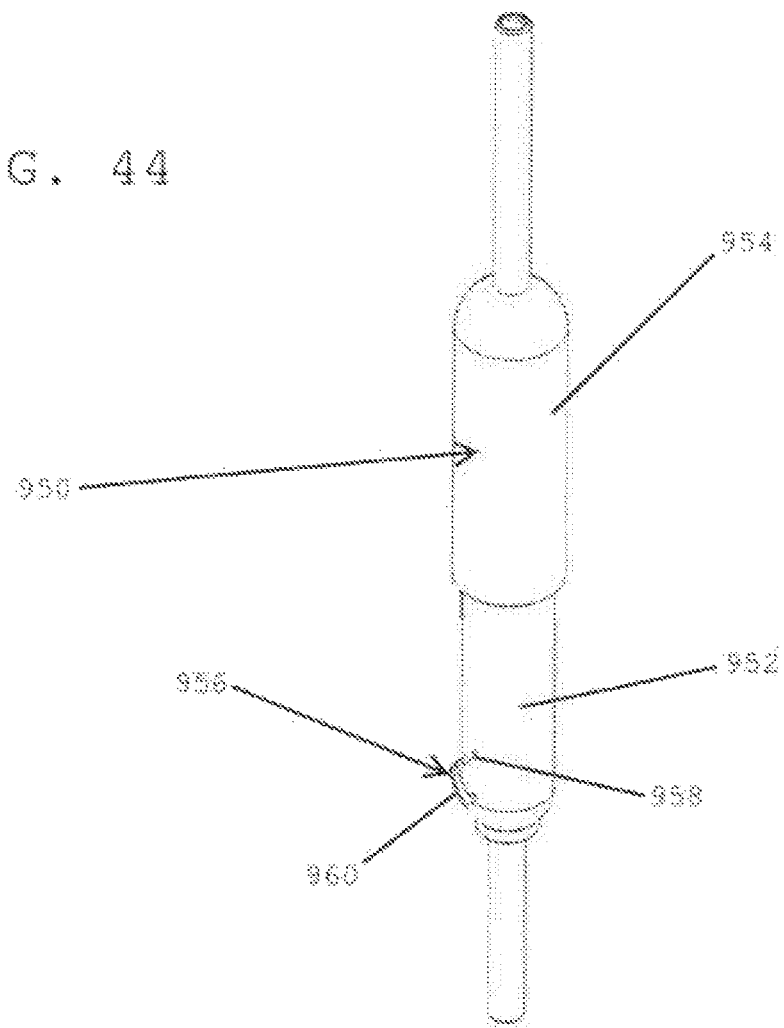
FIG. 44 is a perspective view of an adjustable float according to the present disclosure with a manual air release valve.
Figure 45:
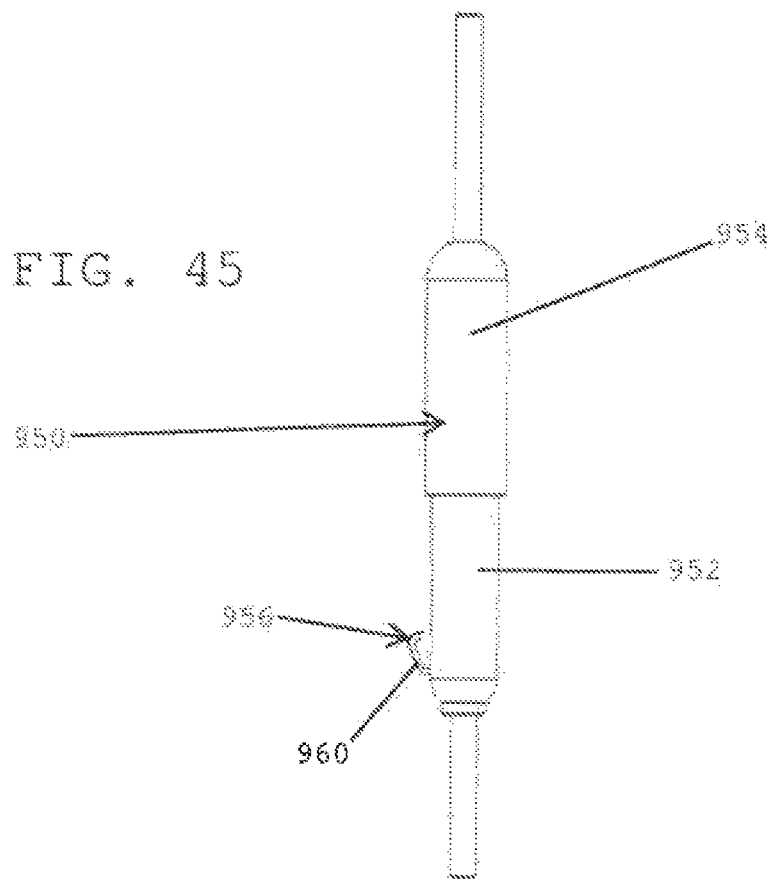
FIG. 45 is a side view of the float of FIG. 44.

FIGS. 44 and 45 illustrate an adjustable float 950 according to the present disclosure that also provides for the release of air from or entry of air into the float. Float 950 includes a male portion 952 and a female portion 954. A valve 956 is provided which is in communication with an interior air space with float 950 and defined between the male and female portions. Valve 956 may include an opening 958 and a closing member 960. As shown, valve 956 is in an open position with member 960 withdrawn from opening 958. The open position allows air to enter or leave the air space as the buoyancy is adjusted. When the desired buoyancy is reached, member 960 can be inserted into opening 958 and block the passage of air.

As an alternative to having an attached member to seal or open the valve opening, a separate element like a plug or bung may be provided with vented floats according to the present disclosure.

As a further example, a rotating sleeve might be mounted about the female portion of a float according to the present disclosure, the sleeve having an opening positioned to be generally lined up or in communication with opening 958. Rotation of the sleeve so that the holes are remotely positioned from one another might serve to close the valve while positioning of the sleeve with the openings aligned might permit air to enter or exit the air space.

A still further example might be to have a recess is the seal between the male and female portions that may be selectively closed or opened by the placement or removal of a removable element. The insertion of the removable element might also serve to more securely hold the male and female portions in the desired position and ensure that the set buoyancy of the float does not change until such a change is desired.

Figure 50:
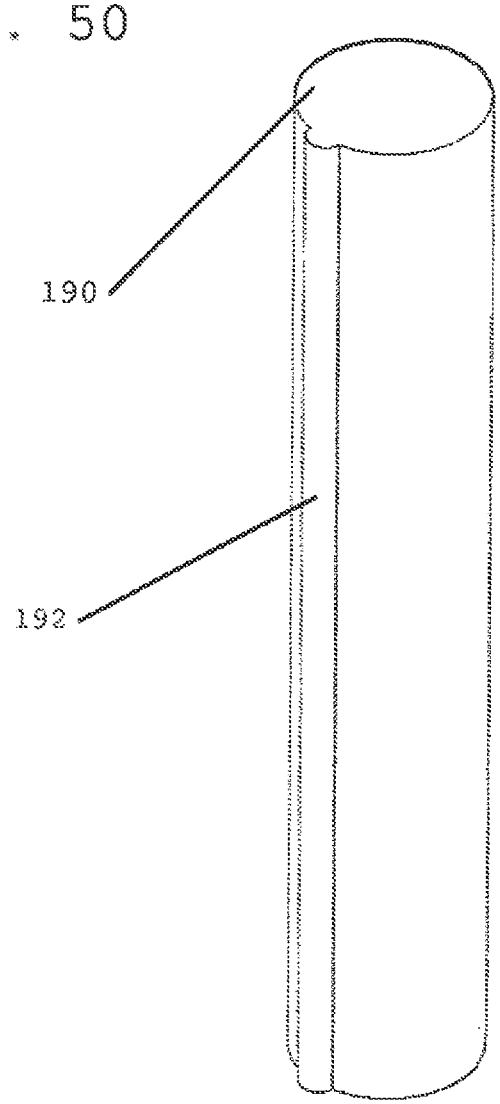
FIG. 50 is a perspective view or an alternative embodiment of a male portion of an adjustable float according to the present disclosure.
Figure 51:
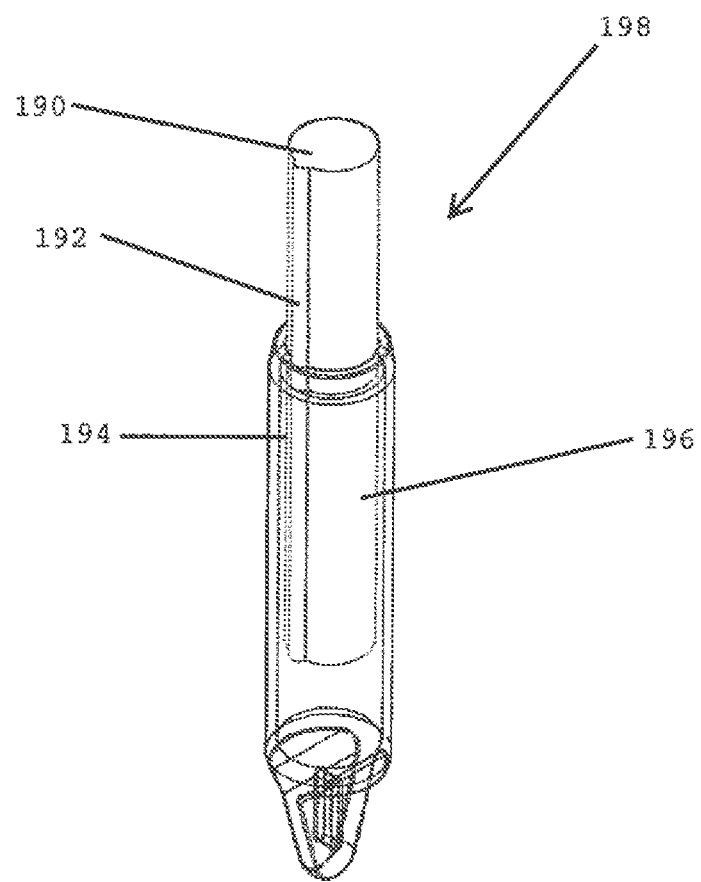
FIG. 51 is a perspective view of an adjustable float according to the present disclosure with the male portion of FIG. 50 positioned within a mating female portion.
Figure 52:
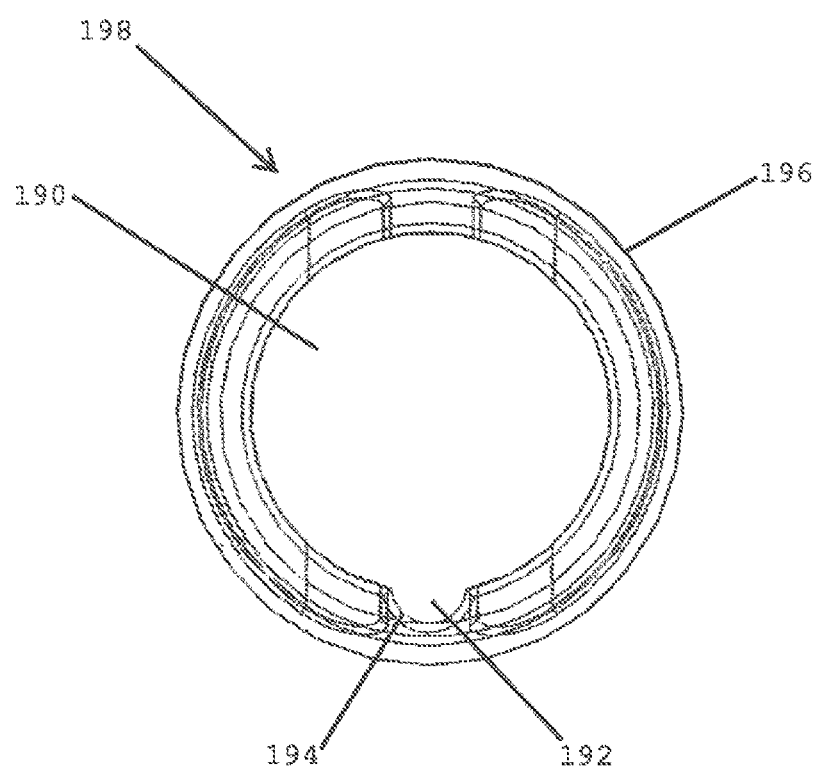
FIG. 52 is an end view of the float of FIG. 51.

Another example might be to have a recess in an inner surface of a female portion of a float and to have a male portion or insert 190 shaped as shown in FIGS. 50 to 52. FIGS. 51 and 52 illustrate a float 198 according to the present disclosure with an selectively openable vent. The opening and closing of a vent channel or recess 194 in a lower body or female portion 196 may be selected by the angler by rotating insert 190 within female portion 196. When a nose 192 of insert 190 is positioned within recess 194 of female portion 196, air cannot escape or enter the air space through the recess. When insert 190 is rotated so that nose 192 is no longer positioned within channel 194, air would be able to flow through the channel either into or out of the air space.

It is not intended to limit the present disclosure to any one particular vent design and the preceding example are illustrative only. There are a variety of venting approaches that may be incorporated into the floats of the present disclosure that would be within the knowledge of a person having ordinary skill in the art and it is not the intent of this disclosure to provide an exhaustive listing of any and all such valves within the present disclosure. It is anticipated that other approaches to venting excess air from within or permitting air from outside to enter the air space are within the scope of the present disclosure.

Figure 46:
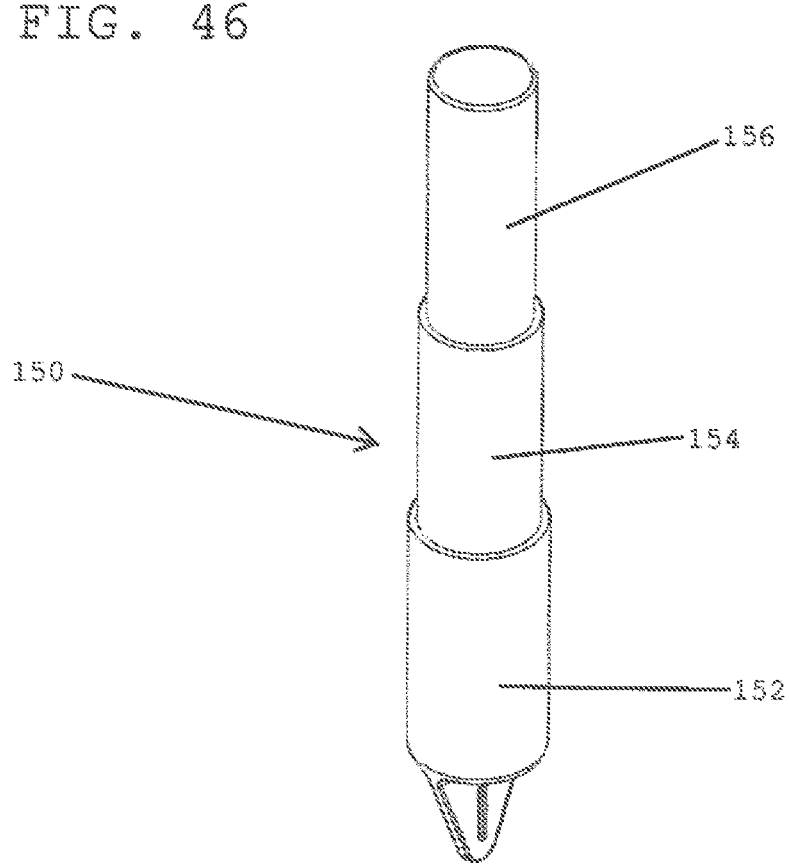
FIG. 46 is a perspective view of an adjustable float according to the present disclosure with a plurality of inserts.

Referring now to FIG. 46, a still further embodiment of a float 150 according to the present disclosure is illustrated. While the floats above have been illustrated and described as having a male portion and a female portion, it is anticipated that additional elements or portions may be included to provide addition levels of buoyancy for a particular adjustable float. Float 150 includes a female portion 152 into which may be inserted an intermediate element or hybrid portion 154. Intermediate portion 154 is acting as both a male element with regard to female portion 152 and also as a female portion with regard to an outer male portion 156. An additional interior air space may be defined within float 150 by the arrangement of portion 154 and portion 156. This air space may be joined to the airspace within float 150 between portion 152 and 154 or may be a separate air space. It is not intended to limit the present disclosure to float having to or three male and female elements. It is anticipated that floats according the present disclosure may have one or more male portions, one or female portions and one or more hybrid portions that can mate with both male and female portions alike.

While the inserts or male elements have been illustrated primarily as solid components, it is not intended to limit the present disclosure to any particular cross-sectional construction. Male elements in the present disclosure may be hollow or open ended as desired.

It is also not intended that the present disclosure be limited to square cut outer ends. The ends of the floats of the present disclosure may be arranged or shaped as desired by particular usage or aesthetic considerations. The outer shape of any of the various components may be similarly be altered as required for a particular usage or aesthetic desire, provided the functional characteristics of the relationship of the elements is maintained. Line attachment features may be added at any location along the various embodiments of floats without straying from the boundaries of the present disclosure.

Different elements of the floats of the present disclosure may be monolithically machined, formed or molded or may be machined, molded or formed or formed of materials having different characteristics. By way of a non-limiting example, an insert may have core of a less malleable material that has a more deformable material molded or positioned over the core. The outer material may provide the deformation and resiliency desired to ensure a good water resistant join between the insert and the body into which it is inserted while the inner core may provide a greater degree of durability. Alternatively, core material may be chosen for its specific gravity to alter the neutral or baseline buoyancy of the float in which it may be used. It is anticipated that any of the male or female components described herein may include inner and outer materials of different types or physical characteristics within the scope of the present disclosure.

Components may be packaged together to provide a complete float or replacement or alternative components may be sold to provide renewal or alteration of the buoyancy, shape, color or other characteristics of an existing float.

It is anticipated that float according to the present disclosure may include line attachment elements on an end of either the male or the female portion, along a side of the float or may permit the line to pass through the float along an internal conduit. Such variations permit the user to decide how best or most desirably to use the float as part of a presentation of bait to fish. Some floats may include line attachment elements on both the male and female portions. It is anticipated that line attachments on floats according to the present disclosure may allow the line to be secured to the float at a particular location along the line or that the float may be allowed to freely move along the line when in use. It is also anticipated that each male and female element may include independent and different line attachment elements or that the line attachment elements are removable and replaceable on any particular male or female element. Line attachment elements may be added during manufacturing or provided as a later added item to retailers or to anglers.

While various male and female portions or elements have been illustrated as molded or formed as a single piece, it is understood that the present disclosure is not limited to unitary or monolithic construction. In situations where elements of multiple properties are desired, e.g., a softer portion to aid in forming the water resistant join and a firmer portion to aid in durability or for a particular use, it may be desirable to construct that element from multiple components. Any of the elements described herein might be constructed, molded or otherwise formed as a unitary structure or may be constructed from one of more elements.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

What is claimed is:

1. An adjustable fishing float comprising:
a first female portion having an open end providing access into a cavity thereof, the cavity having a bottom opposite the open end, wherein (1) the first female portion is constructed of a rigid material, (2) the cavity is cylindrical and has a constant inside diameter, and (3) the first female portion has a narrowed portion adjacent the open end, wherein the narrowed portion has a diameter that is smaller than the diameter of the cavity;
a second male portion having a cylindrical configuration with an outside diameter that is larger than the diameter of the narrowed portion adjacent the open end of the first female portion so that it is sized to fit through and be squeezed by the narrowed portion adjacent the open end of the first portion, the second portion inserted into the first female portion defining an air space between an inner end of the second male portion and the bottom of the first female portion, the air space providing a buoyancy to the float, the second male portion having a unitary, single-piece construction, the second male portion having a solid, cylindrical configuration extending along a longitudinal axis, and the second male portion being constructed of foam, the foam second portion being resilient and deformable, and adapted to being twisted during insertion into the first female portion such that it deforms and its outside diameter temporarily is reduced to permit air to pass through the open end of the first female portion and into and out of the air space;
the first female and second male portions defining a water resistant seal adjacent the open end to prevent water from entering the air space;
the second male portion being reusably, adjustably slidable back and forth into and out of the first female portion to permit the re-adjustable alternation of size of the air space and air volume displaced by the float to change the buoyancy of the float;

wherein the second male portion has a nose with a width smaller than the outside diameter of the second male portion and a length extending along the longitudinal axis of the second male portion and protruding from a side of the second male portion in a radial direction with respect to the longitudinal axis of the second male portion;

wherein said narrowed portion adjacent the open end of the first female portion engages and squeezes a resilient deformable outer surface of the second male portion, including the nose: (1) coupling the second male portion to the first female portion, (2) sealing the air space and resisting intrusion of water, and (3) venting air out of the air space as the second male portion is moved into the cavity while twisting the second male portion and deforming the nose.

2. The adjustable fishing float of claim 1, further comprising a line attachment on the first portion.

3. The adjustable fishing float of claim 2, wherein the line attachment is positioned on an end of the first portion opposite the open end.

4. The adjustable fishing float of claim 1, further comprising a vent permitting air to be released from and enter into the air space.

5. The adjustable fishing float of claim 4, wherein the vent is a manually actuated vent.

6. The adjustable fishing float of claim 5, wherein the manual vent comprises a channel extending from the open end of the first female portion into the cavity, wherein the nose selectively engages the channel, and wherein the second male portion is rotatable with respect to the first female portion and the nose of the second male portion is rotatable away from the channel to permit air to enter or leave the air space.

7. The adjustable fishing float of claim 1, further comprising a weight that is configured to be positioned within the air space to alter the buoyancy of the float.

8. The adjustable fishing float of claim 1, wherein the first portion is made from a material permitting visual inspection of a position of the second portion within the first portion through an outer wall of the first portion.

9. The adjustable fishing float of claim 8, wherein the first portion has an outer surface and the outer surface of the first portion includes indicia markings.

\* \* \* \* \*